Patented July 6, 1954

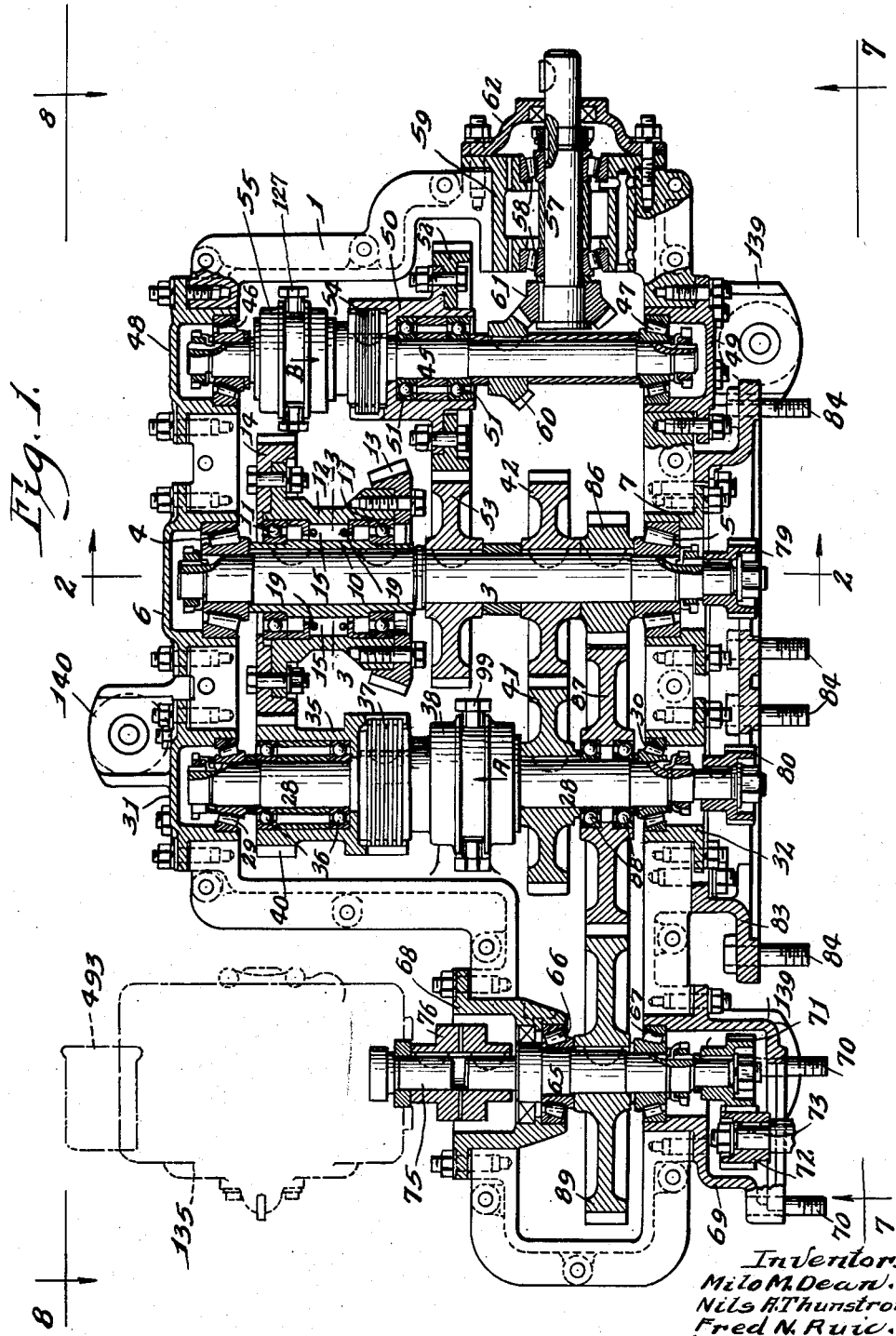

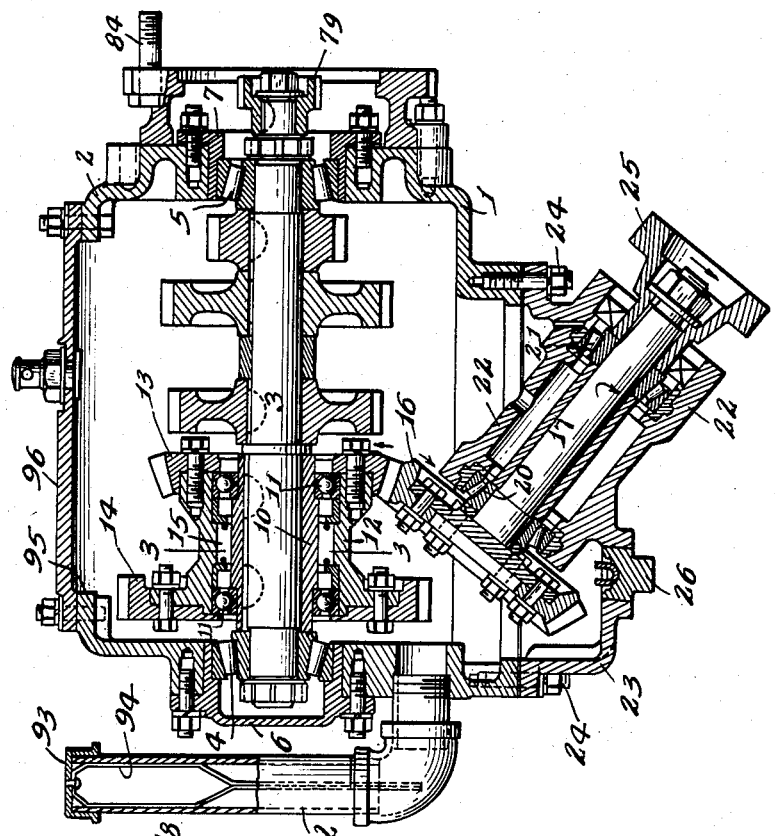

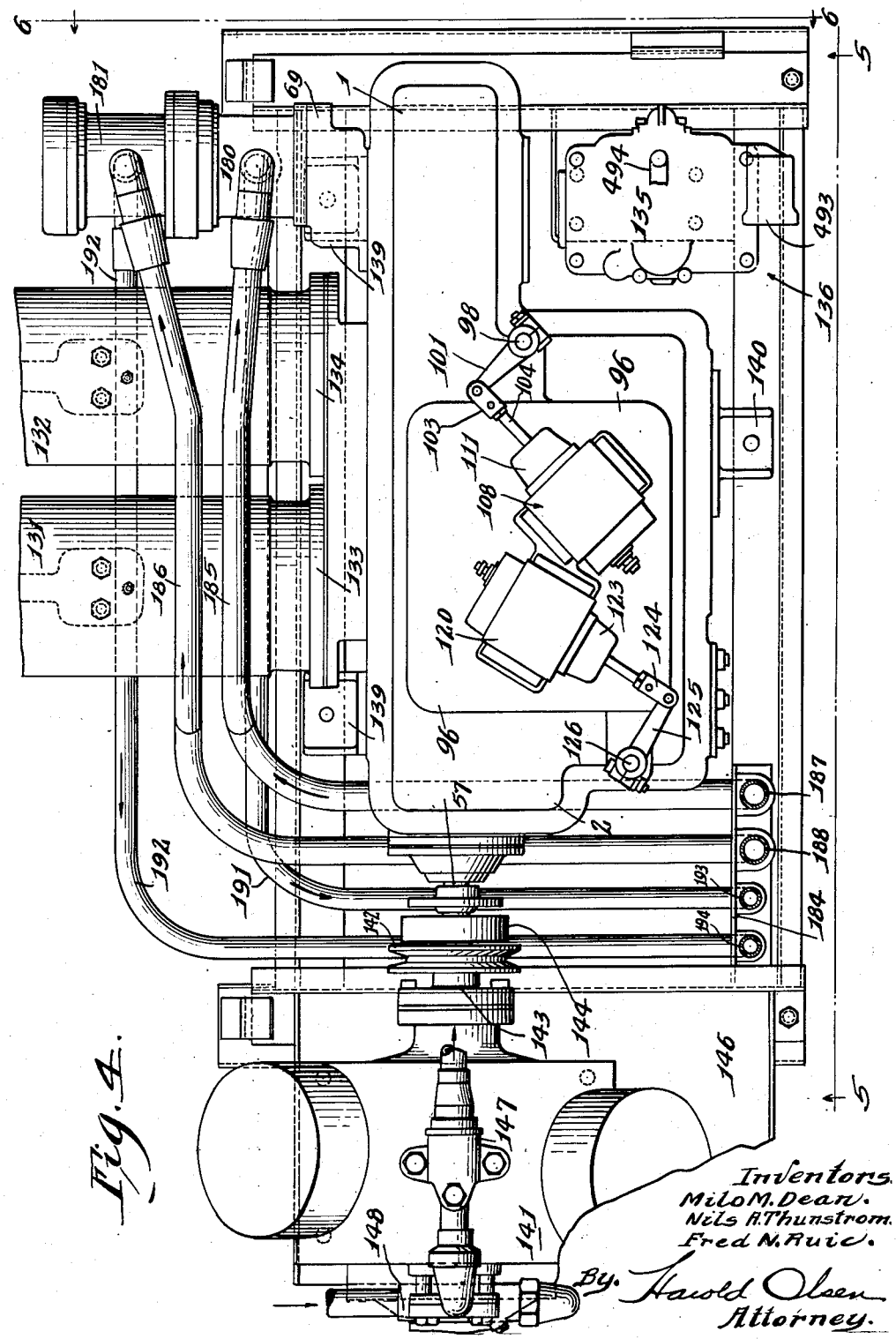

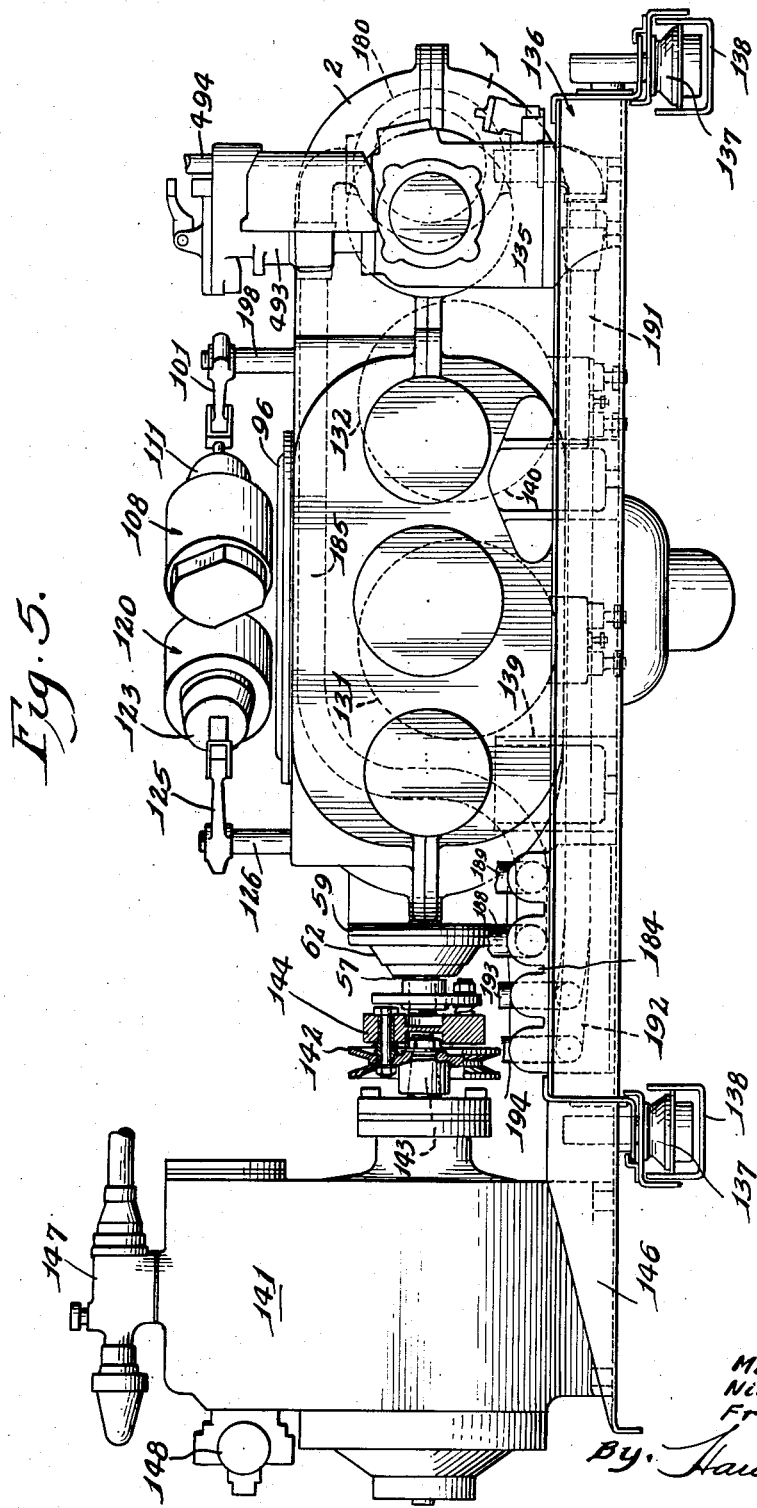

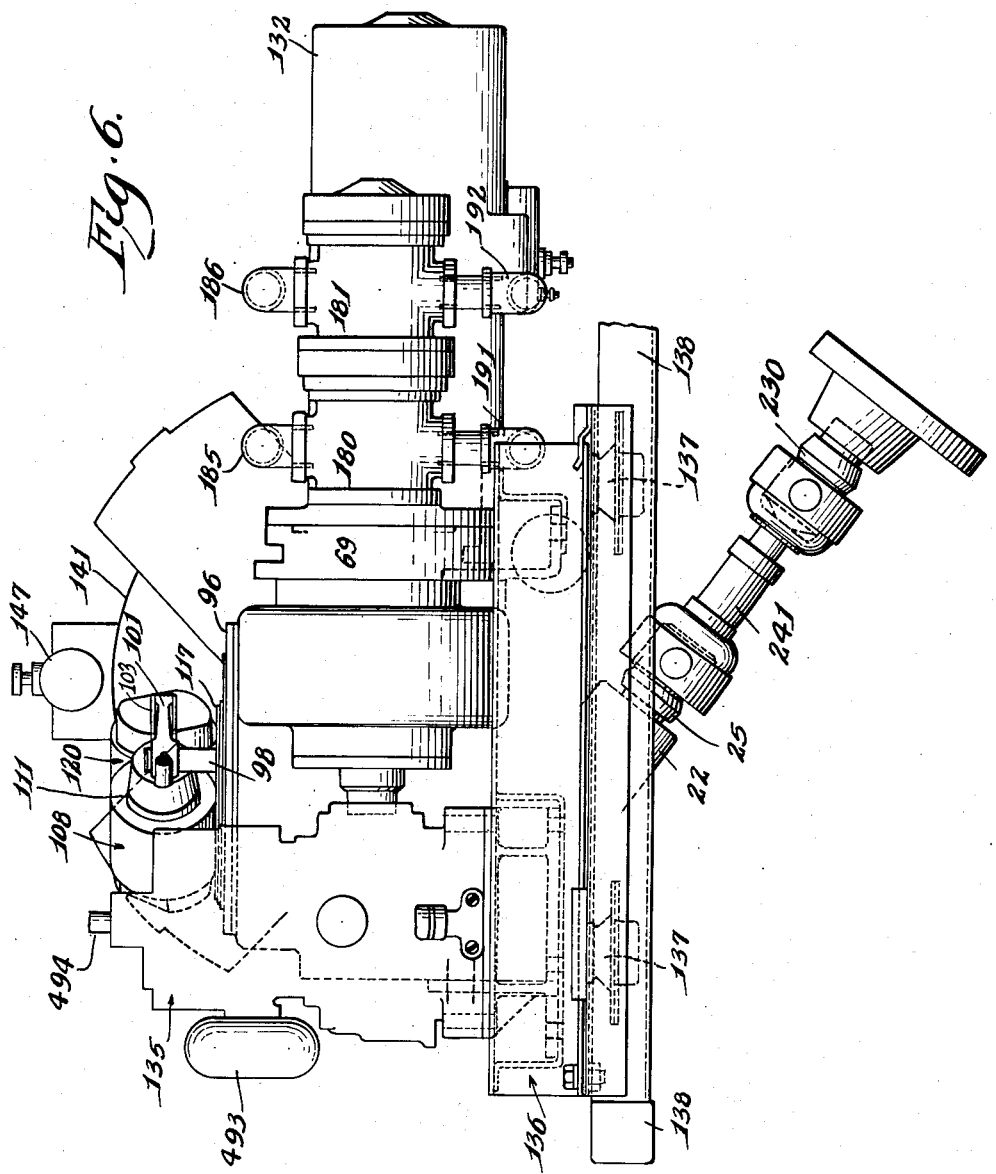

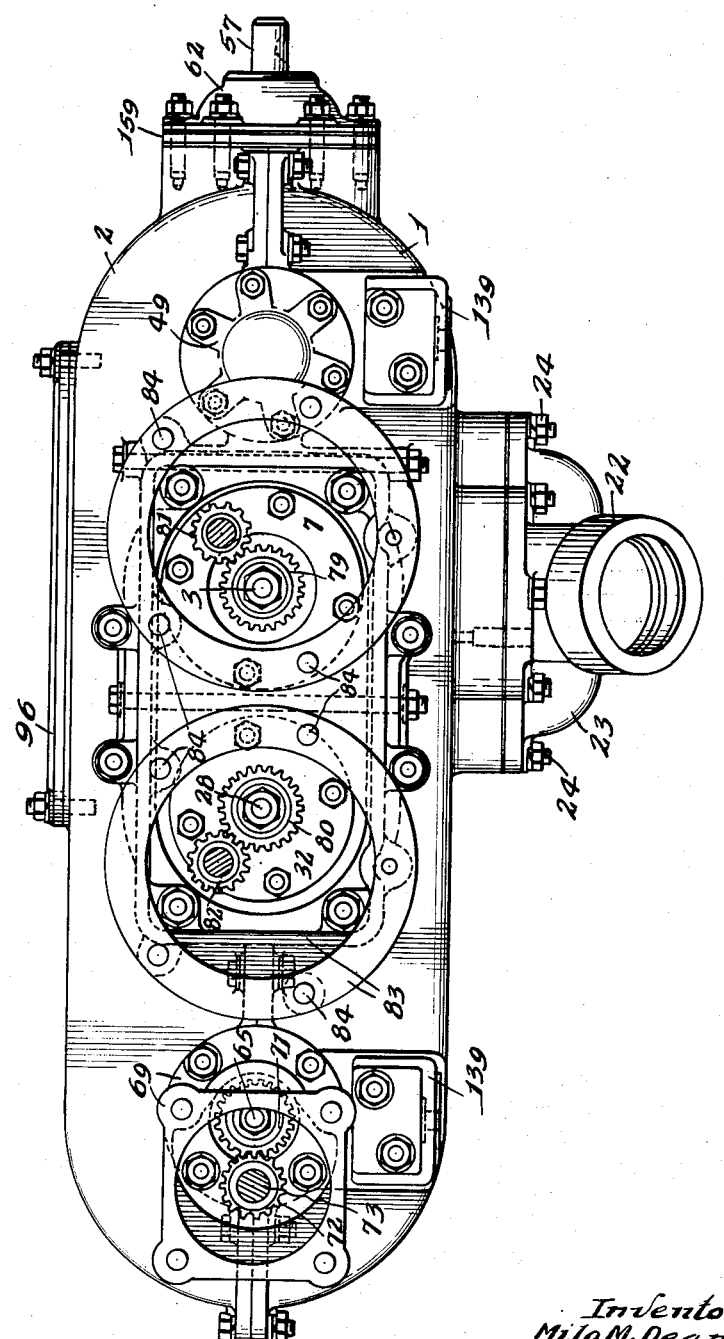

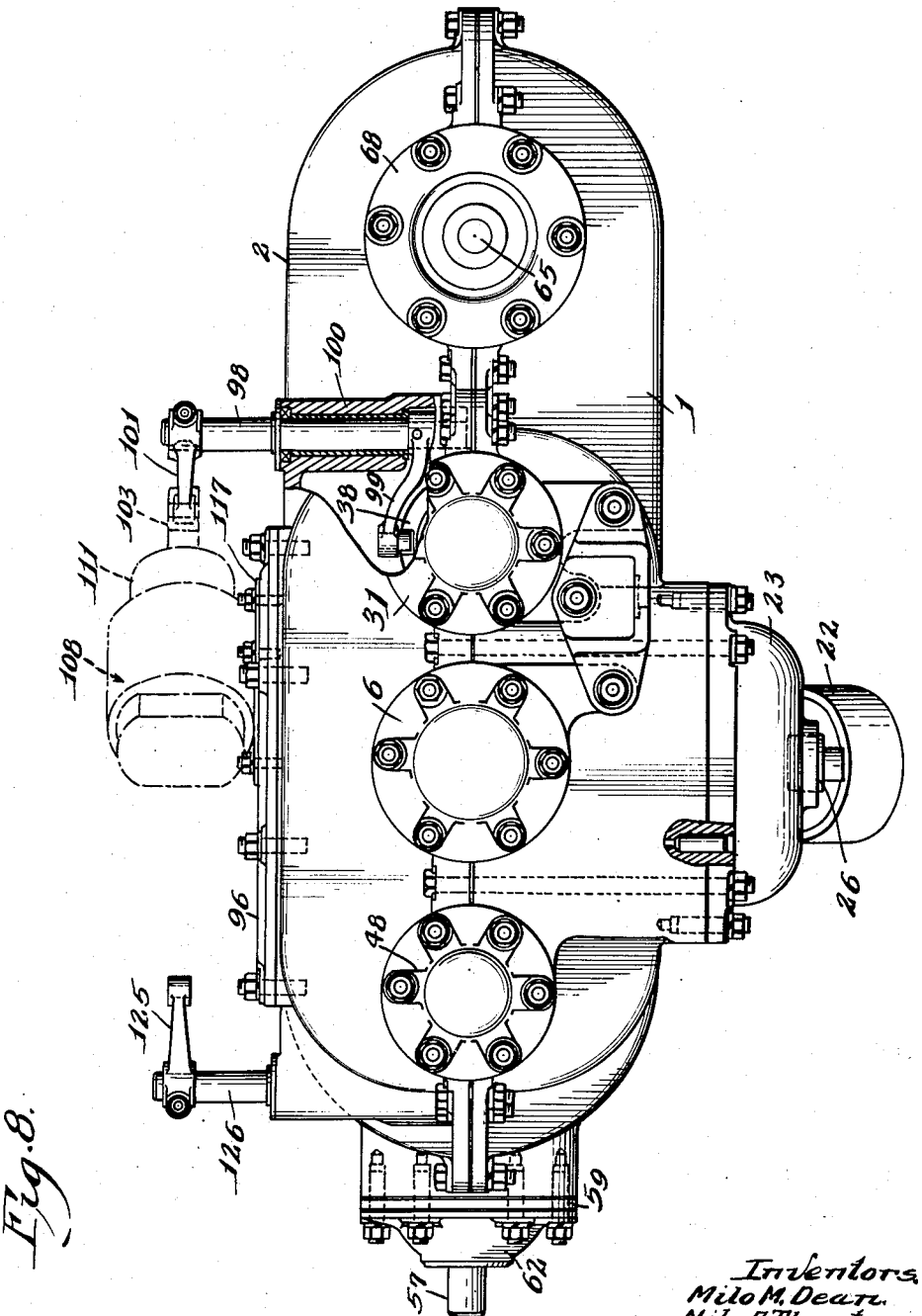

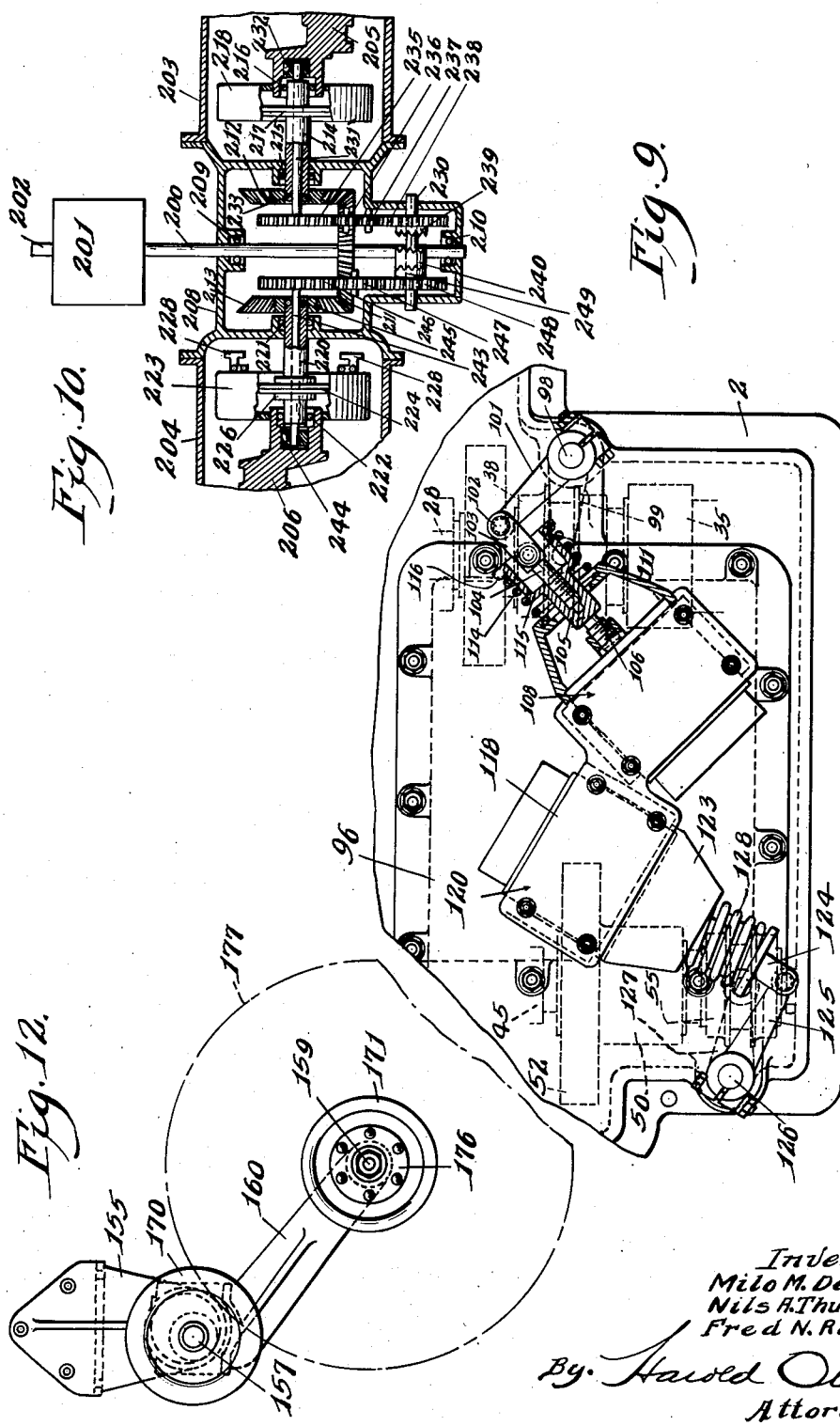

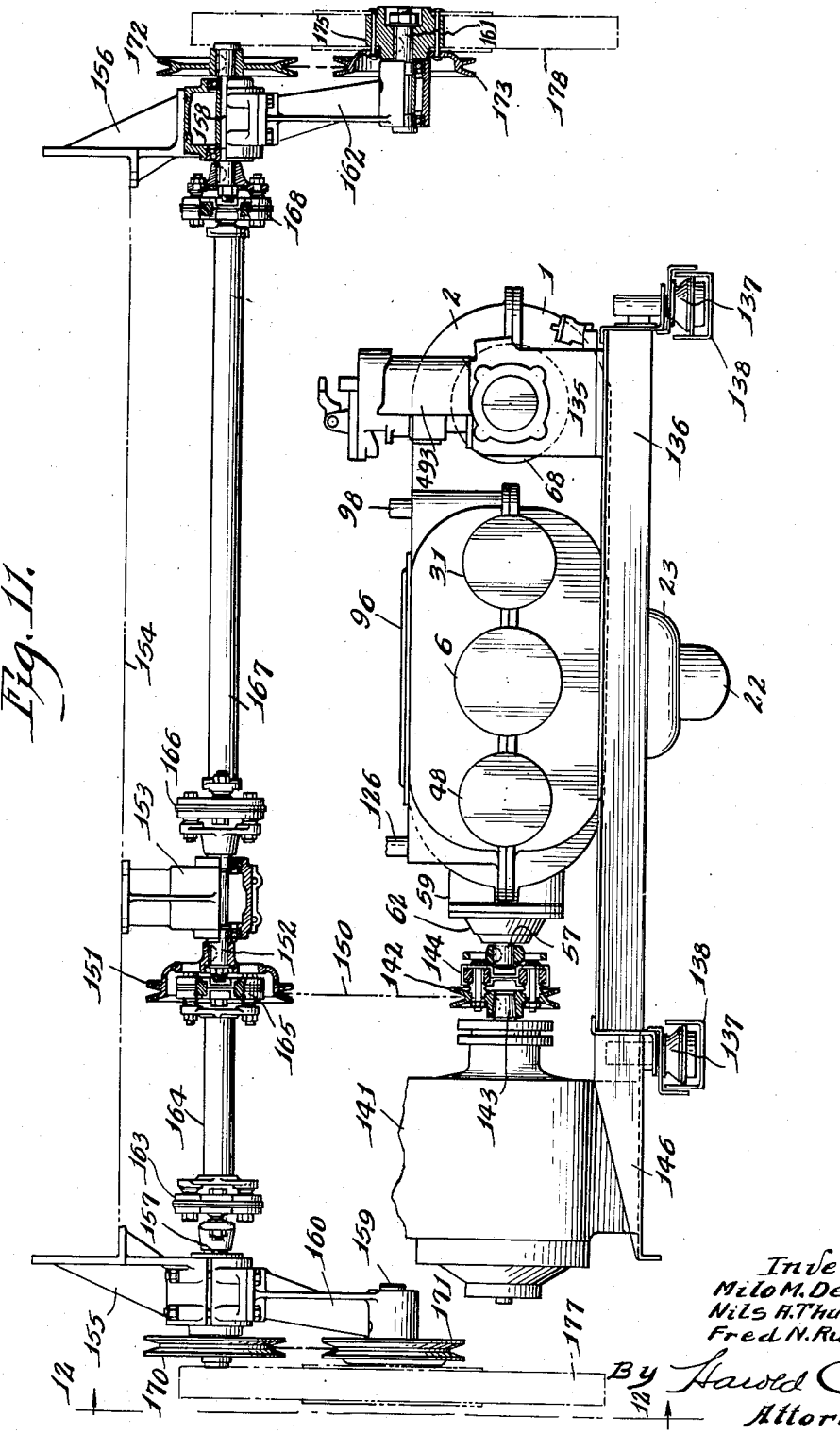

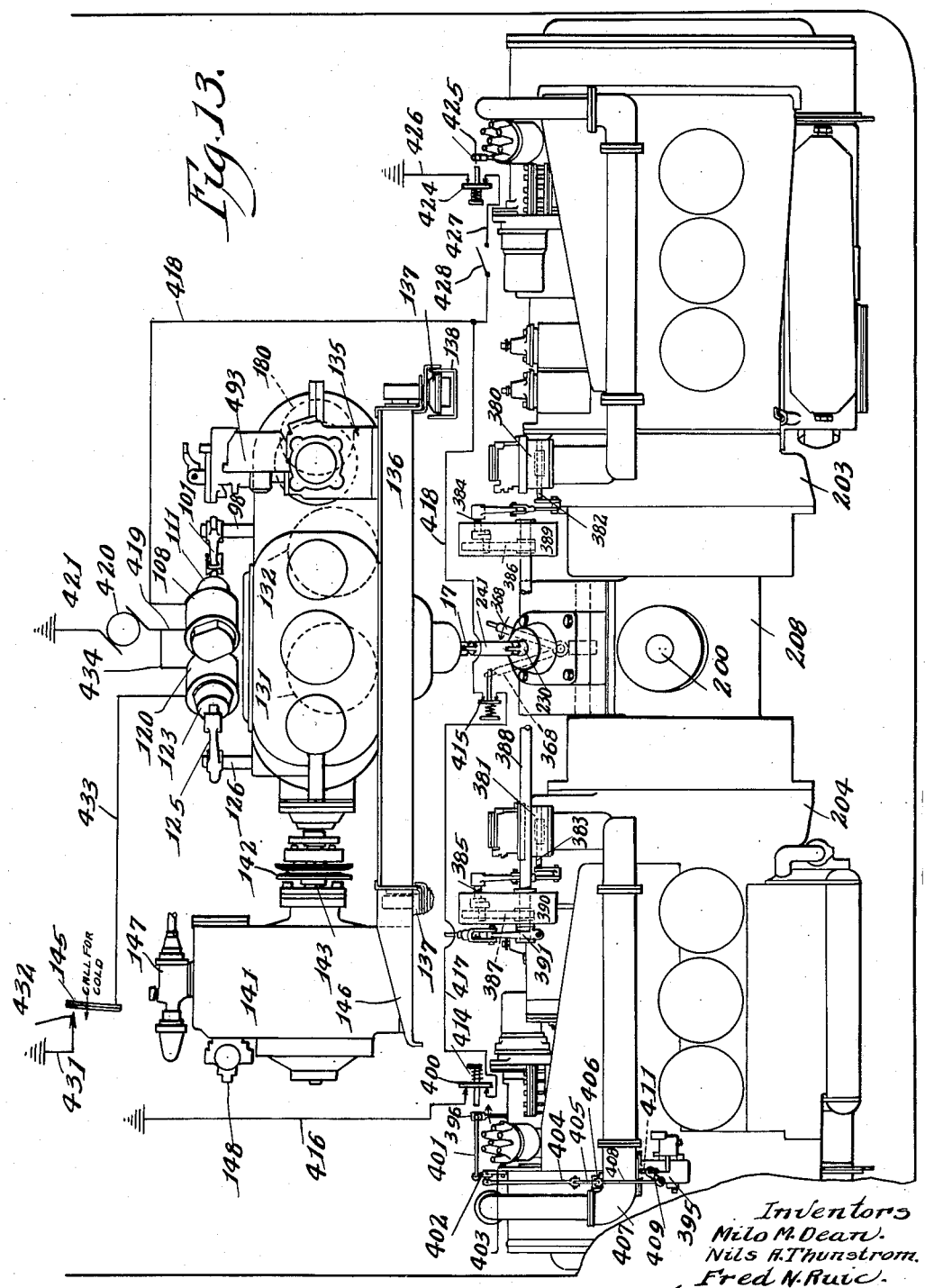

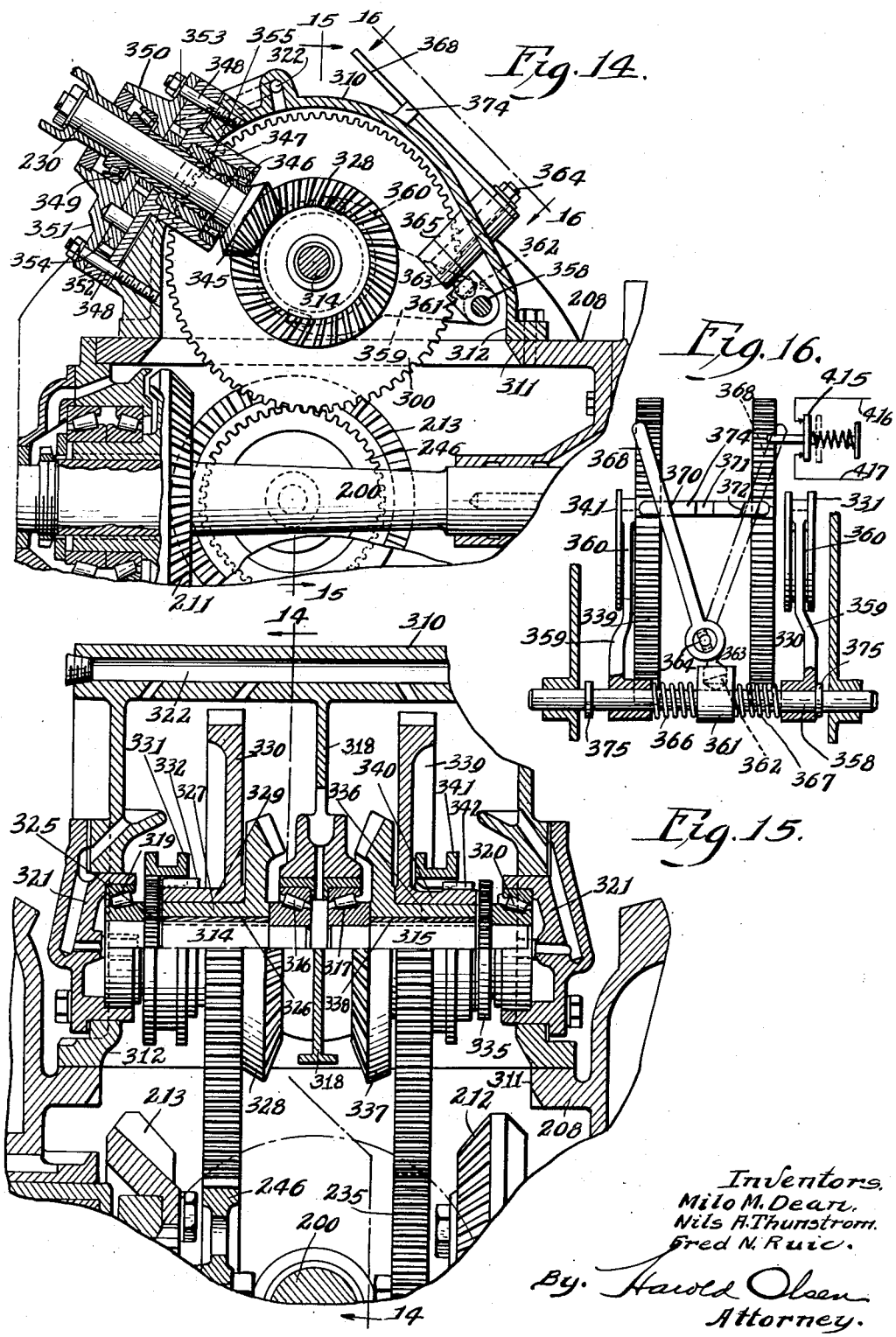

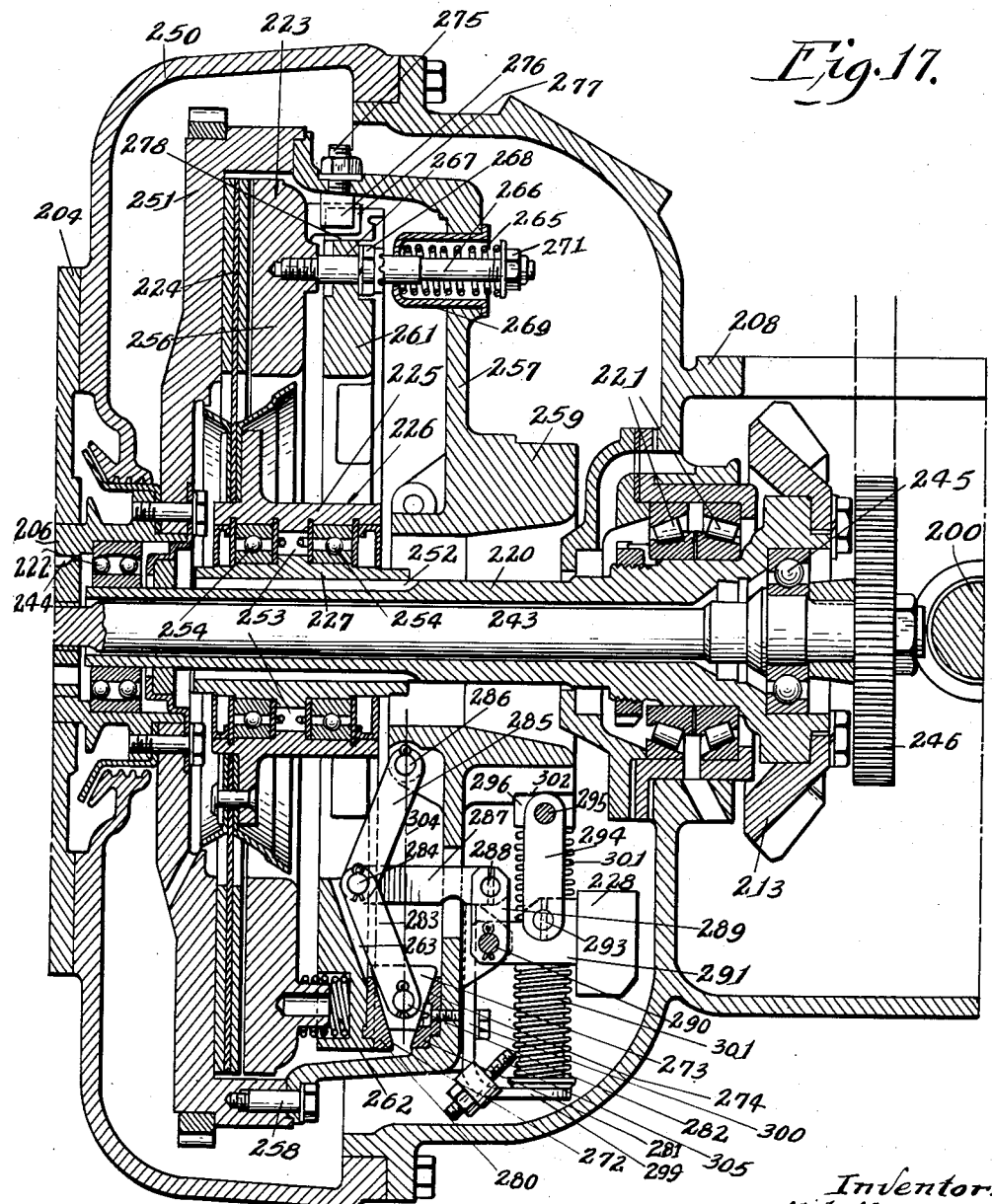

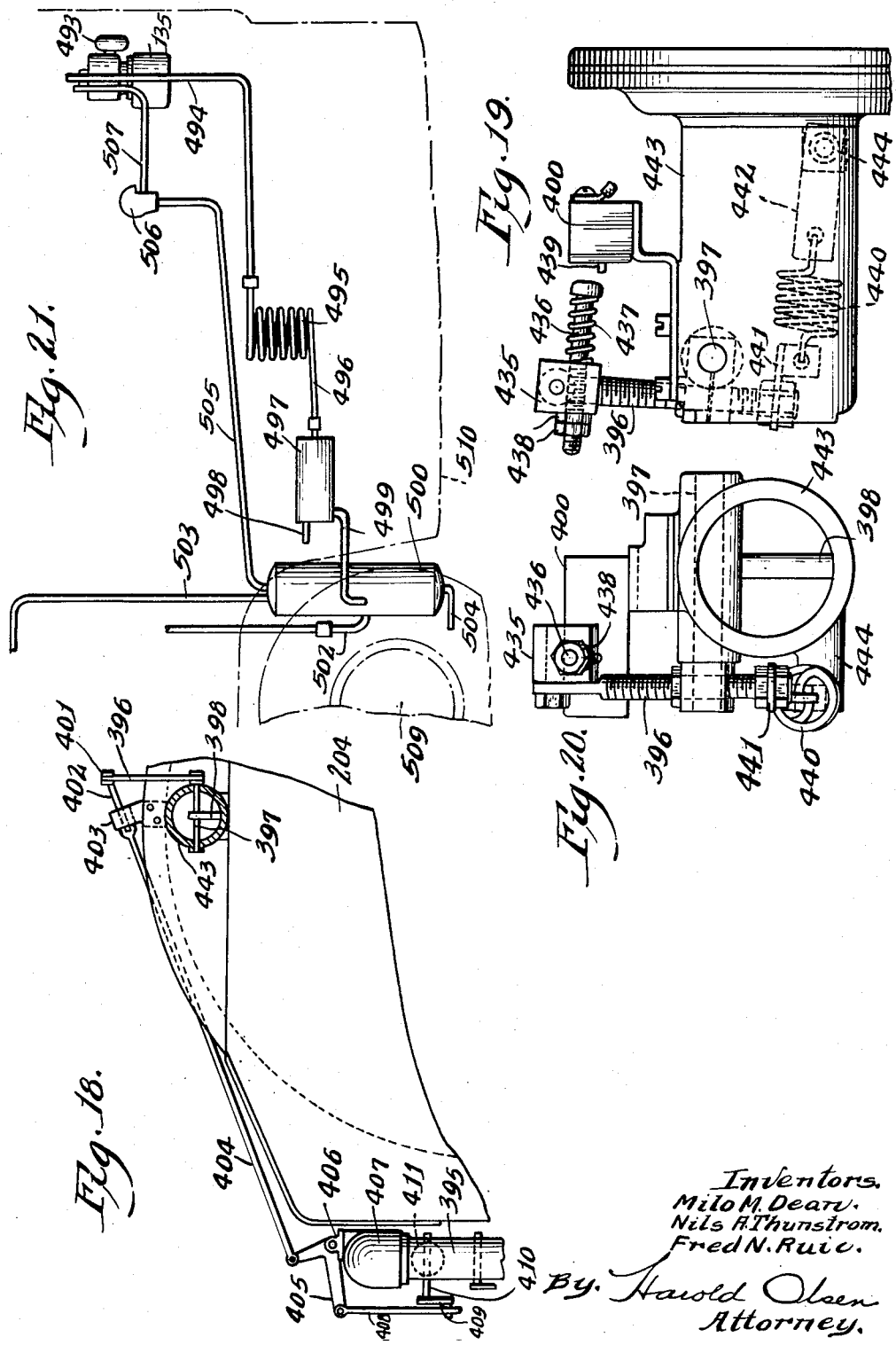

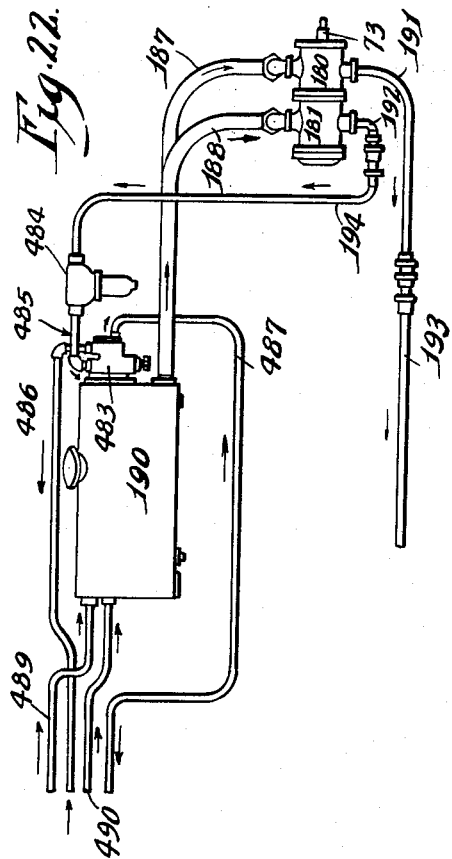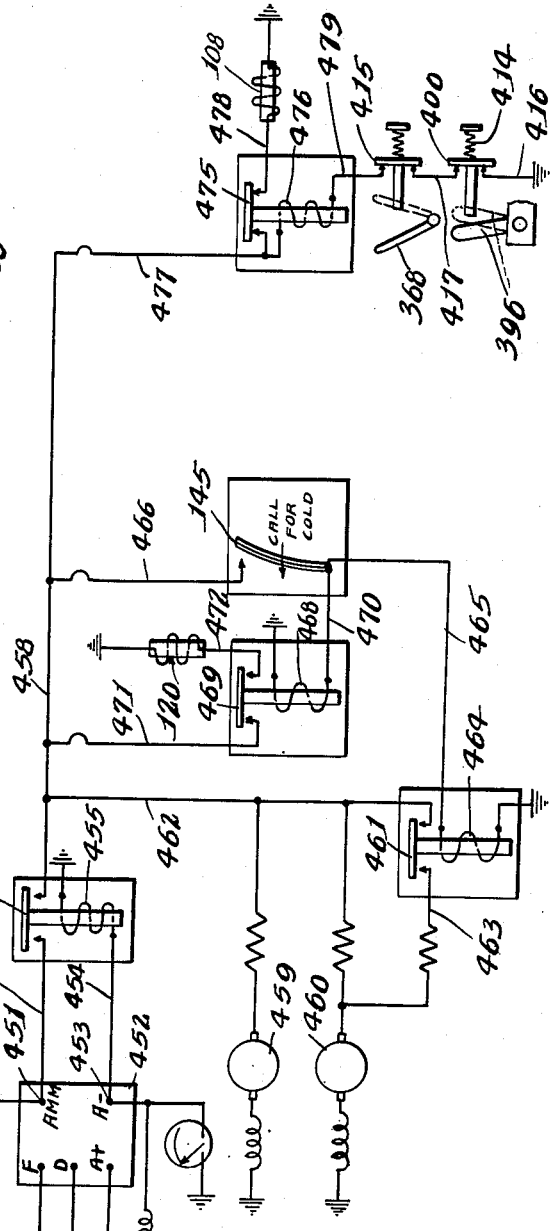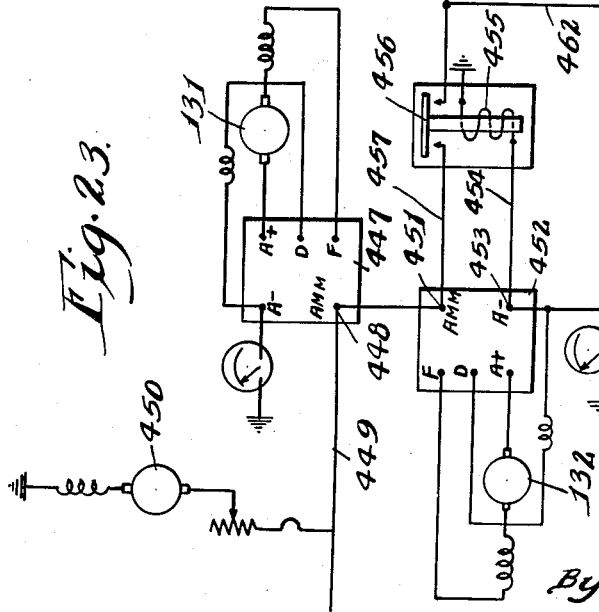

2,682,928

UNITED STATES PATENT OFFICE 2,682,928

SPEED-REGULATION FOR ENGINE DRIVEN ACCESSORIES FOR AUTOMOTIVE VEHICLES

Milo M. Dean, Palatine, and Nils A. Thunstrom and Fred N. Ruic, Chicago, Ill., assignors to The Greyhound Corporation, Chicago, Ill., a corporation of Delaware Application October 30, 1948, Serial No. 57,602

9 Claims. (Cl. 180—53)

1

This invention relates to improvements in power plants for automotive vehicles, and particularly for public vehicles such as busses, in which large engine power capacity is needed to drive the vehicle under greatly fluctuating load and road conditions, as well as to drive all of the numerous accessories for the vehicle. Among the problems involved are not only that of providing adequate power for all of these purposes but of providing such power at the lowest possible original cost, and of reducing operating costs to a minimum, including servicing, repair and fueling.

In a co-pending application, Ser. No. 737,976, there is disclosed a solution of the power capacity problem, by the use of two engines of substantially the same horse power and each capable under favorable conditions of simultaneously driving the vehicle, and all accessories. Normally one of the engines is used only for driving the accessories and is operated at relatively low speed with sufficient power to drive all accessories at their rated speeds. This low speed drive is attained there, as well as herein, with good power economy. Because only part of the power of this engine is used in driving the accessories, its surplus power is available for assisting in driving the vehicle. This surplus power is generated by increasing engine speed, which would result in overspeeding of the accessories, were it not for the provisions of the present invention. The present invention therefore solves the problem of overspeeding of the accessories under the above conditions of engine use. The invention is also applicable for speed control of the accessories by, or in relation to, any engine, which may under any conditions or at any time operate at a speed or speeds which would tend to overspeed the accessories.

In the co-pending application, as well as herein, high engine speeds are related to the transmission of engine torque for assisting the main engine in driving the vehicle. For this purpose one engine has a centrifugal clutch, solely controlled by engine speed, which acts to transmit assisting torque only when engine speed exceeds the relatively low speed at which it normally drives only the accessories. For speeds above this low speed, assisting torque transmission occurs, and if it were not for the present invention the accessories would be overspeeded throughout the period of this assisting action. Accessory speed regulator action is also herein related to the engine speed at which assisting torque is transmitted.

2

Thus, along with the new conception of using low speed power of an engine to drive all accessories, and of using its surplus high speed power to assist in driving the vehicle while accessory drive continues, an additional conception of a way to avoid substantial overspeeding of the accessories throughout high speed engine operation is disclosed herein.

The regulator device herein is valuable for use with an engine which operates most of the time at a low speed and power output to power all accessories, and only operates at high speeds in an emergency for the dual purpose of vehicle and accessory drive. Thus the action of the regulating device to prevent overspeeding is in this phase of the invention only necessary when the engine is operating above its normal low speed and low power output. Where two engines are used and when vehicle and accessory drive is to be accomplished only by the main engine, with its greatly fluctuating speeds, it is contemplated herein to ordinarily discontinue speed-regulating action but at the same time to continue the drive of the accessories through the regulator mechanism.

Now in driving the vehicle the speed of the main engine fluctuates greatly because of speeding up for transmission shift or because of speeding up when the transmission is in intermediate or low gear. Unless it is necessary that the main engine be driven at high speed in low gear for a considerable period of time, the operation of the means herein for preventing overspeeding may not always be necessary. Nevertheless conditions may arise, while the main engine alone is driving the vehicle and the accessories, in which the engine will be operating over long periods at high speed and therefore we have provided for the automatic operation of the accessory speed regulator by either engine. Although we have provided means whereby accessory speed regulator action is interrupted when the driving of the accessories is shifted to the main engine, we have also provided means whereby this regulator action can be automatically resumed when accessory drive is shifted back to the auxiliary engine. Thus we provide means by which speed regulation of all accessories can be controlled by either engine, and also provide for constant automatic speed regulation by one engine, as well as for optional speed regulation by the other engine in accordance with engine speed requirements during emergencies, as when the main engine only is driving vehicle and accessories.

Inasmuch as the present invention is in some respects related to the invention of the previously mentioned copending application, some of the drawing illustrations used in said co-pending application have been used herein, but only so much of said illustration has been used as is necessary to illustrate structures which are adapted to carry out what are believed to be entirely new functional combinations of the present invention.

While the present invention includes the specific structure of the accessory speed regulating device, per se, it involves more than the use of a specific form of intermediately placed accessory speed-regulating engine-driven device, in that a method of control of such a functionally equivalent device is provided which includes, in one phase of this invention, the use of a single engine having successively acting carbureting means, which can be selectively operated for fueling the engine at respectively different speeds conformably to differential carburetion control in obtaining low and high engine speeds.

This invention also relates to methods and means for powering the accessories efficiently and economically, either by the use of a single engine, or by the use of two engines, along with means by which either engine can power the vehicle and the accessories and always drive the accessories substantially at their most economical speeds irrespective of the greatly varying engine speeds.

Another object is to provide a special engine for powering the accessories, with means engine-governed for automatically controlling the speed of special intermediate gearing, directly from which the power elements of all accessories are driven, and with the gearing elements so associated that their speed relations or ratios can be changed conformably to varying engine speeds, in a manner to prevent overspeeding and yet at all times to operate the accessories efficiently.

Another object is to provide a special accessory driving engine with fueling-control means including a carburetor or carburetors adapted to provide for different degrees of speed and therefore power output for the engine, and to relate these different speeds to the torque transmitting speed of a centrifugal clutch through which the engine can transmit power for driving the vehicle.

Another object is to have a certain proportion of carburetion fuel engine-regulated to fuel the engine at a constant speed and with power sufficient to properly drive all accessories, and to have available additional carburetion fuel for the engine to increase its speed and power for causing the centrifugal clutch to transmit torque for driving the vehicle.

This invention also has among its important objects: to avoid engine unbalance due to mounting the accessories on the engine, or due to direct drive of the accessories therefrom, and therefore to avoid the increased wear of engine parts which necessarily results from such mounting or direct driving; to provide an integrated accessory drive unit so adapted or designed that all desired accessories can be supported adjacent thereto or thereon and driven therefrom, with the unit readily removable for servicing or replacement of the power elements thereof; and to obtain maximum accessory output without manual attention, for filling air tanks, charging batteries, etc., as needed when getting a vehicle such as a bus ready for the road, as after a layover. We believe that our invention provides for the first time means by which the above objects can be accomplished with a maximum of efficiency together with a maximum of economy.

Other objects of the invention are: to provide speed-regulating means for a plurality of devices through which all of said devices can be simultaneously driven and speed-regulated by the interaction of two clutches; to drive said speed-regulating means from a single shaft; to drive said means by a single engine having means for respectively fueling the engine in different speed ranges; to provide engine-regulated means for automatically controlling said speed-regulating means conformably to changes in engine speed as controlled by said fueling means; to provide engine-regulated means for each engine responsive to different ranges of engine speed, to control said speed-regulating means; to provide clutch means in relation to said single shaft, movable to transmittibly couple either engine with the shaft, and to provide means operable by said clutch means for making effective the engine-regulated means of an engine, for control of said accessory speed-regulating means conformably to varying engine speeds; and to accomplish simultaneous drive and speed regulation of a plurality of accessories by means including two clutches, one of which drives the other; and to use the outer race of an overrunning clutch to drive the driven member of a disk-clutch as part of the means for accomplishing simultaneous speed-regulation of said plurality of driven devices or accessories.

Another object is to provide engine speed-regulated control means for automatically effecting a change of speed in the power input shafts of all accessories, in such manner that when engine speed rises above some predetermined R. P. M. the speeds of the all power input shafts of the accessories are simultaneously temporarily reduced so that thereafter and on continued rise in engine speed above that predetermined R. P. M., the speed of the said input shafts can correspondingly increase, paralleling the increased engine speed, but without overspeeding the accessories even for high engine speeds and to accomplish the above object by the use of an overrunning clutch in relation with an engine-speed-controlled clutch.

Features of the invention include, the interrelations of three clutch means with an engine, and with a vehicle which can be driven by the engine, and with a speed-regulating device for simultaneously regulating the speed of each of a plurality of vehicle accessories, and in which the engine is adapted by the use of a first clutch and at a certain higher engine speed to transmit torque for driving the vehicle, and in which in response to raised engine speed second and third clutches associated with the speed change device act in a manner to prevent overspeeding of the accessories as engine speed increases to close the first clutch; the use of two engines in relation to those three clutches and to the accessories and to the speed-regulating device so as to drive the accessories by either engine and to provide for accessory speed-regulating action and drive from either engine. Thus the use of three clutches, two engines, and shift means by which either engine can control the speed regulating device are believed to be new in conception and action.

Features of this invention also include: the coordination of accessory speed regulation shift with the speed at which automatic transmission of torque for driving the vehicle occurs; the provision of means for annulling regulation operation of the accessory speed-regulating mechanism, when vehicle drive is shifted to another engine; and the provision of means by which resumption of accessory speed regulation through the speed-regulating mechanism can be had if desired while the other engine is driving the accessories.

It is also a broad conceptional feature of this invention that, from two main drive shafts of an intermediate accessory drive unit, all other shafts of the unit are driven at the proper speeds, and that the speed ratio changes between these two main shafts according to engine speeds results in corresponding speed changes in the power input shafts of all accessory power devices. These devices are compactly grouped on a separate support entirely separate from the engine or engines.

Another phase of this invention relates to the use of an engine regulated electric switch in the circuit of an electric generator driven by the engine through a speed-regulating device, which will maintain the generator at efficient R. P. M. but will prevent overspeeding of the generator when engine speed rises above a predetermined R. P. M.

Another phase of the invention relates to the association of three clutches: a centrifugal clutch, an overrunning clutch, and an oil clutch, in the manner hereinafter illustrated and described, and to the use of two engines with means by which either can drive the vehicle with the centrifugal clutch operable by one of the engines and with either engine capable of independently driving an accessory speed-regulating device through which the accessories are directly driven. In this phase of the invention the accessory speed change is related to the speed at which centrifugal clutch transmission occurs.

Objects, phases, features and advantages of our invention will also be referred to in the description of the drawings, and in said drawings, Fig. 1 is a top plan view of the accessory drive unit and casing, with the top cover removed to show the arrangement of the primary, secondary and auxiliary shafts, and the gearing and clutches, and with parts of said casing, gearing and clutches in section, and with the accessory power units removed;

Fig. 2 is a vertical section through the unit and casing taken on line 2—2 of Fig. 1 showing the overrunning clutch in section and showing how the outer race of the clutch is driven;

Fig. 3 is an enlarged vertical transverse section taken approximately on line 3—3 of Fig. 1 further illustrating the overrunning clutch construction;

Fig. 4 is a plan view of the mount casing showing how the various accessory power units are positioned and mounted, and showing the arrangement of solenoids and of the piping for the pump;

Fig. 5 is a side elevation of Fig. 4 viewed from line 5—5 of Fig. 4;

Fig. 6 is an end elevation of Fig. 4 viewed from line 6—6 of that figure;

Fig. 7 is a side elevation of Fig. 1 viewed from line 7—7 of that figure;

Fig. 8 is a side elevation of Fig. 1 viewed from line 8—8 of that figure;

Fig. 9 is a fragmentary top plan view further illustrating the solenoids and related clutch control, and clutch shifting structures;

Fig. 10 is a somewhat diagrammatic plan section showing the general arrangement of the engines in their relation to the vehicle, and to the shaft through which the elements of the accessory drive unit are powered;

Fig. 11 is an elevation showing the relation of the speed regulator mechanism to the pulley drive device for the fans of the air-conditioning system;

Fig. 12 is an end elevation showing the pulley drive viewed from the position of line 12—12 of Fig. 11;

Fig. 13 is an elevation of the engines looking toward the front of the vehicle or bus, showing the three carburetors and their operating means, and showing somewhat diagrammatically the engine-regulated switch, and the switch which is controlled by the transmission shift mechanism, and also showing the electrical connections between the switches and the regulator solenoid and the electric generator, for controlling the accessory speed-regulating device;

Fig. 14 is a vertical section through the main and tower casings taken longitudinally of the vehicle, approximately on line 14—14 of Fig. 15, and illustrating in more detail some of the elements of Fig. 10;

Fig. 15 is a vertical section through the main and tower casings taken transversely of the vehicle and approximately on line 15—15 of Fig. 14, and looking forwardly of the vehicle;

Fig. 16 is a schematic view of the clutch mechanism of Fig. 14 viewed from the position of line 16—16 of that figure; and showing the switch which is actuated when shift occurs to interrupt drive by one engine and establish drive for the other;

Fig. 17 is a vertical section through the main casing and the flywheel housing of the auxiliary engine, illustrating the combined centrifugal clutch and overrunning clutch mechanism for driving the vehicle;

Fig. 18 is a somewhat diagrammatic vertical cross section of the engine-regulated means for the small carburetor of the auxiliary engine. Another view of this means is shown at the extreme left of Fig. 13;

Fig. 19 is a detail side elevation of the engine-regulated switch for controlling the clutch-operating solenoid of the speed-regulating gearing, with the parts positioned as when the engine is operating at a lower speed, that is, as before the switch is opened;

Fig. 20 is an end view of the structure of Fig. 19;

Fig. 21 is a diagrammatic view showing part of the compressed air system, including the air compressor which is on the casing of the speed-regulating unit and which is driven from the mechanism of said unit;

Fig. 22 is a diagrammatic view showing parts of two hydraulic systems, including two hydraulic pumps driven from a shaft of the speed-regulating mechanism, which shaft also drives the air compressor; and Fig. 23 is a diagram showing part of the electrical system of the automotive vehicle, which diagram includes two electrical generators respectively driven from the primary and secondary clutch-driven shafts of the speed-regulating mechanism of this invention.

We will now proceed to describe specific structures by which the various objects of our invention can be carried out.

Accessory speed-regulating unit

Referring first to Figs. 1 and 2, which show the speed-regulating gearing, clutch elements, and gears driven by terminal gears at the ends of some of the shafts, the power devices for the accessories having been omitted. The base or bottom section of the case or casing is generally indicated at 1, and the top or cover section is indicated at 2, see Fig. 2. The sections are suitably secured as by bolts.

From the five shafts shown in Fig. 1 are driven seven devices, to wit: a "freon" compressor, a pulley for operating the fans of the cooling system of which the compressor is a part, two electric generators, two hydraulic pumps, and an air compressor. These devices are shown in Figs. 4, 5 and 6 and their functions will be more fully described.

A first shaft which is sometimes referred to as the primary shaft is indicated at 3, and rotates in roller bearings 4—5 respectively mounted in a tubular capping retainer 6, and in an open end tubular retainer 7, both flanged and secured by bolts. Keyed to the shaft 3 is the inner race 10 of an overrunning clutch, and rotatably mounted on this inner race by means of ball bearings 11 is an outer race 12. On the outer race are mounted two gears, one a bevel gear 13 and the other a spur gear 14. The bevel gear is driven by a bevel gear, see Fig. 2, as part of the drive mechanism, later to be described, which gear is driven from a terminal shaft, which can be driven by either of two engines by means, including a clutch shiftable to transmittably connect either engine with the drive mechanism for gear 13.

The clutch elements or rock-blocks of the overrunning clutch are indicated at 15 in Figs. 1, 2 and 3, and the other essential details of the clutch will be more fully described herebelow. The bevel gear 13, see Fig. 2, is in mesh with a bevel gear 16 driven by a shaft 17 slantingly disposed as shown, and held in roller bearings 20 and 21 of a tubular structure 22 which is part of a cover 23, suitably bolted as at 24 to the bottom section 1 of the mount casing. For simplification this shaft 17 may be considered to be the input shaft for all accessory speed-regulating elements. Keyed to the outer end of the shaft 17 is a yoke 25 as a part of a universal joint connection by which the shaft is driven from the engine through gearing which includes a shift element or clutch, by which either of two engines may be transmittibly connected with the input shaft 17 and therefore with gear 13. An oil drain opening in the bottom wall of the cover 23 is normally closed by a plug 26. The case is kept filled with oil in sufficient quantity to keep all gearing thoroughly lubricated, and to keep the clutch disks later to be described lubricated. The oil is introduced through a suitable filter pipe described herebelow.

Referring to Fig. 3. The series of clutch blocks 15 are adapted to rock and obtain wedging clutch action against the outer surface of the inner race 10 and the inner surface of the outer tubular race 12. In the figure the clutch blocks are in released position. When the rotative speed of the outer race as driven by the engine through shaft 17 and gears 16 and 13 becomes greater than that of the inner race 10, or shaft 3, clutch-in action occurs and the first shaft 3 is driven. As an illustrative example, this clutch-in action occurs when engine speed reaches about 1200 R. P. M. Each rock-block 15 has lateral grooves 18 one in each opposite side, and circular constrictive coil springs 19 lie in the grooves one at each side of the circular series of blocks. This mechanism is only claimed in its particular functional relation to the other elements of the combination. Its structure per se is not claimed. Any suitable type of overrunning clutch may be used.

A second shaft, see Fig. 1, is indicated at 28 and this is sometimes referred to as the secondary shaft. It is the shaft through which the accessories are driven at engine speeds below 900 R. P. M. This shaft rotates in roller bearings 29 and 30, respectively mounted in a tubular flanged capping retainer 31 and in an open end tubular flanged retainer 32. This second shaft 28 is driven from spur gear 14 of the outer race of the overrunning clutch through clutch means structurally differing from the overrunning clutch, and which comprises in this embodiment an oil type disk clutch. The driving cup for one set of disks is designated at 35 and this cup is rotatably mounted on shaft 28, as shown, by bearings 36. This clutch may be of any suitable type or make, and since the structures and actions of such clutches are so well known, it has not been thought necessary to illustrate the same more fully. The disks of these oil clutches are generally made of hardened steel and run at high speed in a bath of oil, and means is provided herein for filling the case with the proper amount of oil so that all gearing and disks are at all times adequately oiled. The disks are generally indicated at 37 and one set is keyed to the driving cup 35 and the other set is keyed to the shaft 28 in a well known manner. The clutch has a grooved shift sleeve 38 which, in the type of clutch used herein, operates camming levers, not shown, to apply pressure against the disks to obtain friction drive. The disks are disposed between suitable thrust rings, not shown, one stationary on the shaft and the other axially slidable. Thus a system of camming levers is moved to clutch-in and clutch-out positions by a shiftable grooved sleeve or ring 38 moving alternately in opposite directions. The clutch is shown in its open or release position in Fig. 1, and moves in the direction of the arrow A to closed or clutch-in position.

In this instance the oil clutch is shifted to closed position by means of a solenoid 103, or equivalent means, and a spring associated with the plunger of the solenoid holds the clutch open, when the solenoid is de-energized. Movement of the plunger on energization of the solenoid coil closes the clutch against the action of this spring. See Fig. 9 for the relations of the shifting fork to the sleeve 38 and to the solenoid-operated shifting mechanism.

When the solenoid is energized the grooved shift sleeve 38 is shifted to cause the friction disks to be engaged and the disks remain engaged or clutched in as long as the solenoid is energized. This solenoid is energized when the engine starts. The spring is sometimes referred to as the clutch throw-out spring because it moves the clutch to "out" or open position on de-energization of the solenoid. Energization of the solenoid is controlled by an electrical engine-governed switch which is closed when the engine starts and is adapted to be opened when the engine speed rises to 1200 R. P. M.

On the driving structure 35 of the oil clutch is formed, or secured, a spur gear 40 which meshes with the spur gear 14. In this embodiment, but not necessarily in all embodiments, the gear 14 is of substantially greater diameter than that of the gear 40, so that the secondary shaft 28 is normally and initially, or at relatively low engine speed, driven at a higher R. P. M. than that of the outer race 12 of the overrunning clutch. Since, as will be more fully explained, under this condition the shaft 3 is driven at the same speed as shaft 28 and the inner race 10 of the overrunning clutch is driven at a greater rate than the outer race 12, the overrunning clutch remains open.

Conformably to an example given for illustrative purposes only, as to shaft speeds and accessory speeds: the shafts 3 and 28 may be driven through clutch 35 within a range of from 2700 to 3600 R. P. M., for low engine speeds from 900 to 1200 R. P. M., and may be driven through the inner race 10 of the overrunning clutch at from 1660 to 3600 R. P. M. for higher engine speeds such as from 1200 to 2600 R. P. M. It will be noted at this time that a centrifugal clutch of the engine goes in after engine speed has risen above 900 R. P. M. to transmittibly connect the engine for driving the vehicle, while at the same time the engine continues to drive the accessories.

The spur gears 41 and 42 respectively keyed to shafts 28 and 3 adapt each shaft to drive the other at equal speed. Thus if the shaft 28 is initially driven through the outer race 12 of the overrunning clutch, at a certain speed, shaft 3 is driven by gears 41 at the same speed as shaft 28. On the other hand when shaft 3 is driven by the closed overrunning clutch (clutch disks 37 then being open) shaft 28 is driven by gear 42 at the same speed as shaft 3. Thus the speeds of the accessories are properly maintained by drive from either shaft.

It is to be noted that when disks 37 are opened the speeds of shafts 28 and 3 temporarily drop, so that the speed of the outer race 12 becomes greater than that of inner race 10 on shaft 3, and the overrunning clutch takes hold to drive shafts 3 and 28. The speeds of shafts 3 and 28 now rise with rising engine speed, as it ranges from 1200 to 2600 R. P. M. As, per the example, long as engine speed remains above 1200 R. P. M., the drive is through the overrunning clutch. However, shift of driving control from clutch 35 to clutch 10, 12 may occur at lower engine speed, at 950 R. P. M., for example.

While the specific new construction shown is also claimed, it is considered that some phases of the invention are broader than the specific construction, inasmuch as we believe ourselves the first to successfully control the speeds of all accessories to substantially prevent overspeeding, or underspeeding, notwithstanding fluctuating engine speeds. We, of course, also believe that we are the first to control the speeds of two shafts by an overrunning type of clutch intergeared with another type of clutch, or the same type of clutch. The relative gear ratios by which the speed of shaft 3 is made to be greater than the speed of the outer race 12 is also claimed.

A third shaft is indicated at 45 for driving the "freon" compressor, of the air conditioning system for the vehicle. This shaft rotates in roller bearings 46, 47 respectively mounted in tubular capping retainers 48, 49, both flanged and releasably secured by bolts. This shaft 45 is driven through a disk clutch of substantially the same type as that previously described for the clutch of shaft 28. The disk driving cup is indicated at 50 and rotates on the ball bearings 51 carried by the shaft 45. This cup is bolted to a spur gear 52 in mesh with a spur gear 53 keyed to shaft 3.

As per the illustrative example, when clutch 37 is in, this shaft 45 may be caused to rotate within a range of from about 2400 to 3200 R. P. M. for engine speeds between 900 and 1200 R. P. M., and when the overrunning clutch is in, may be caused to rotate at from about 1480 to 3200 R. P. M. for engine speeds between 1200 and 2600 R. P. M.

The clutch disks are indicated at 54 and the shift sleeve is indicated at 55. The sleeve is shown in open clutch position and moves in direction of arrow B to close. Closure of this clutch is controlled through a solenoid 120, see Fig. 9, in the same manner as previously described for clutch elements 35, 37 and 38, except that in this instance solenoid energization is obtained thermostatically on a call for cold, or cooling demand by the cooling system, in a manner to be described. The clutch 55 is normally open and when the solenoid 120 is energized, on cooling demand, and is closed and the throw-out spring is compressed, the clutch is held in until the solenoid is de-energized when the demand for cold has been satisfied. Solenoid energization persists as long as cooling demand continues, and when this demand has been satisfied the solenoid is de-energized and the clutch is spring-opened to interrupt power transmission to the Freon compressor.

A fourth shaft 57 is held in roller bearings 58 of a tubular flanged retainer 59, and is coupled to the drive shaft proper of the Freon compressor through a connection, see Fig. 5, which includes a pulley, and in a manner to be more fully described. The shaft 45 drives shaft 57 through bevel gears 60, 61, which gears in this instance have a 1 to 1 ratio. A cover 62 is held against the retainer by bolts and carries packing for the shaft 57.

A fifth shaft is indicated at 65 and is adapted to drive an air compressor and two hydraulic pumps. The shaft 65 rotates in roller bearings 66, 67, respectively mounted in a flanged retainer 68, and in a combined retainer and adapter 69 suitably flanged, and having studs 70 by which the pump casings, later to be described, are attached. In the adapter 69 are housed driving gears for the pump. One of these gears is indicated at 71 and is keyed to the end of the shaft 65, and the other gear 72 is on a pump shaft 73, of pumps not shown in this figure, which shaft operates the pumps in a manner and for purposes later described. The shaft 65 is coupled to drive a shaft 75 for an air compressor, shown in this figure only in dotted outline. This driving connection is made by a suitable coupling structure 76.

Each shaft 3 and 28 has keyed to one end a spur gear adapted to mesh with another spur gear which drives the rotor shaft of an electrical generator. By means of gears 41, 42 the generators are driven at equal speeds, whatever may be the speeds of shafts 3 and 28. The generator drive gear on shaft 3, see Figs. 1 and 7, is shown at 79 and the gear for shaft 28 is shown at 80. Corresponding companion gears on the rotor shafts of the generators are shown in Fig. 7, respectively at 81, 82. As shown in Fig. 1 these gears are housed in a flanged adapter 83 which is bolted to the regulator casing of the unit, and the flange of this adapter has studs 84 by which the electrical generator casings are attached.

This adapter encloses the flanges of the retainers 7 and 32.

Referring to Fig. 1, shaft 65 is driven from shaft 3 by means of a spur gear train comprising a gear 86 keyed to shaft 3, gear 87 rotatable on shaft 28 on ball bearings 88, and gear 89 keyed to shaft 65. In this embodiment gear 86 is of smaller diameter than are gears 87 and 89.

As shown in Fig. 2 a pipe 92 is provided through which to introduce oil into the accessory transmission-control casing. The pipe has a suitably threaded closure cap 93, to which a suitable metal oil gage structure 94 is attached by a rivet as shown. As best shown in Fig. 2 the top of the upper section 2 of the case has an opening 95 closed by a cover plate 96 removably secured by stud bolts. On this cover are mounted the solenoids previously referred to (not shown in Fig. 2), for shifting the clutches to and holding them in closed-clutch position. Both clutches are opened and held open by springs.

Now referring to Figs. 9, 8, 5 and 6 for the arrangement of the engine-speed-controlled, electro-mechanical clutch control devices. To facilitate reading of the drawings and avoid needless duplication, some parts of the solenoid elements have been omitted in some of the figures, and the journaling of the shift fork shaft of only one clutch has been shown in Fig. 8. It is to be noted that these shift structures and their control means are substantial duplicates functionally and structurally, one being engine-controlled and the other thermostatically-controlled conformably to temperature variations in the cooling system.

Referring first to Figs. 1, 9 and 8. In bearings in the top or cover section 2 of the case there are mounted two vertical shift-fork operating shafts, the principal one 98 for the clutch shift sleeve 38 of the secondary shaft 28, see Fig. 1, and the other 126 for the clutch shift sleeve 55 of the Freon compressor drive shaft 45. The shift-fork shaft 98 for the clutch sleeve 38 has a shift-fork indicated at 99, and only the upper part of the fork is shown. The shaft 98 is held in an elongated bearing 100, of the upper section 2 of the casing. At the top, the shaft has a lever arm 101, see also Fig. 9, secured thereto. At the outer end of this arm are pivoted as at 102, links 103. The opposite end of these links are in turn pivoted to a shank 104 threaded into a coupling element 105, in turn threaded into an extension 106 of the solenoid plunger, not shown, of the solenoid generally designated 108.

The solenoid may be of any suitable type and its constructional details are not shown. Of course, the solenoid construction per se forms no part of this invention and any suitable solenoid or other suitable electrically controllable device may be used. An adapter 111 is secured to the casing of the solenoid. The plunger is brought to an initial clutch-out position by a spring indicated at 114, one end of which is seated in a depression of the adapter. The spring surrounds and is guided by an enlarged hollow extension 115 of the coupling element 105, and the opposite end of the spring abuts a peripheral shoulder 116 of said extension 115. The solenoid structure is suitably secured by means, not shown, to a base plate 117, see Fig. 8, in turn suitably releasably secured to the cover 96. The solenoid structures have a common cover plate 118, suitably secured as by bolts.

Referring to Fig. 9, the structure of the solenoid and associated elements for controlling shifting of the clutch sleeve 55 of the Freon compressor drive shaft 45 is substantially the same as previously described. The solenoid is generally designated at 120. The adapter is indicated at 123, the links at 124, the lever arm of the shift-fork operating shaft at 125, and the shift-fork operating shaft at 126. The shift-fork is indicated in dotted lines at 127. The clutch throw-out spring is indicated at 128.

In Fig. 1 the shift-rings are also shown, but the shift-forks 99 and 127 are, for convenience, shown out of position. Their proper positions are shown in dotted lines in Fig. 9, and in this figure the parts are positioned as when both clutches are open and are being held open by the springs, that is, as they are before the solenoids are energized. When either solenoid is energized its spring is put under greater compression and the clutch is shifted to closed position and so held as long as the solenoid is energized. As soon as a solenoid is de-energized its spring acts to open the clutch and hold it open. The solenoids and their connections are substantially identical except that in the figure the plungers move in opposite directions when energized, this being due to the particular relative arrangements of the primary, secondary and auxiliary shafts. Although it is contemplated that other engine-controlled clutch shifting means may be employed, which will come within the terms of the claims, yet the specific means shown is also claimed, because we believe it to be the first engine-controlled device ever used for the purposes herein.

*Disposition of driven power elements of the accessories*

The arrangement of the power elements of the accessories, including, the compressor for the air conditioning system, the electric generators, the hydraulic pump or pumps, and the air compressor, is believed to be unique. Insofar as we are aware, these elements have never before been so closely grouped, nor mounted on or carried by a single casing, nor closely associated with a single casing. Nor have these elements been arranged in part on a gear casing and in part on a frame that supports the casing. Moreover, it is believed new in conception to group all of the driving shafts for the accessory power elements, and to provide a single speed regulating means for all of these shafts.

Now referring to Figs. 4, 5, 6, 11 and 13. The Freon compressor, electric generators, hydraulic pumps, and air compressor have been somewhat diagrammatically represented. They are supported by the casing which encloses their speed regulating mechanism. These devices may be of any preferred construction and the illustration is therefore not directed to their interior constructions, but to the gearing relations between two main power shafts, and the input shafts for these accessory power elements or devices.

Referring first to Fig. 4. The electric generator casings are shown at 131, 132 and said casings are suitably connected to the gear casing by the terminally threaded bolts 84 shown in Figs. 1, 2 and 7, which bolts pass through flanges 133, 134 of the generator casings. These generators may be of any suitable type and are adapted to supply electric power for substantially all of the electrically operable devices of an automotive vehicle. The relations of the generators to some of these devices is shown in the electrical circuit diagram, Fig. 23. In one embodiment these generators are adapted to be operated at speeds ranging from 3600 to 4800 R. P. M. for engine speeds ranging from 900 to 1200 R. P. M.; and are adapted to be operated at speeds ranging from 2210 to 4800 R. P. M. for engine speeds ranging from 1200 to 2600 R. P. M. The gears 79, 81 and 80, 82 which drive the generator rotors are best shown in Fig. 7 and have been previously referred to.

The illustrative examples herein given of the various speed ranges of the accessories, at high and low engine speeds, are based on the assumption that the accessories have the following rated output speeds for normal operation and maximum output speeds for intermittent operation: normal speed for the two generators 3600 R. P. M., maximum speed 4800 R. P. M.; normal for air compressor 1125 R. P. M., maximum 1500 R. P. M.; normal for combination brake fluid and steering booster fluid pumps 1500 R. P. M., maximum 2000 R. P. M.; normal for Freon compressor 2400 R. P. M., maximum 3200 R. P. M.; normal for condenser cooling fans 2400 R. P. M., maximum 3200 R. P. M.

The air compressor is generally designated 135 and is suitably supported on a metal framework, see Fig. 5, generally designated 136, and on this frame the gear unit casing is mounted. This framework is independently supported on the body of the bus, and not on the engine. The frame 136 is rectangular in plan, extends transversely of the bus, and has a plurality of vertical cushioning elements 137, engaging and supported by a channel-iron structure 138, which is secured to the body in a manner not shown. The air compressor may be of any suitable type, and serves to supply compressed air for various bus requirements, by means of a system partly shown in Fig. 21, and later to be described. This compressor is driven from shaft 65, see Fig. 1. The connection of the gear or shaft casing with the frame 136 is made by means of brackets 139, 140. For engine speeds ranging from 900 to 1200 R. P. M. the air compressor 135 may be operated at from 1125 to 1500 R. P. M. For engine speeds of 1200 to 2600 the air compressor may be operated at from 690 to 1500 R. P. M.

A refrigeration compressor, as a driven power-element for a Freon air conditioning system, is generally indicated 141 and may be of any suitable type or make. It is driven from shafts 45 and 57 of Fig. 1, in a manner previously described, and the drive is controlled through clutch 54 in a manner previously described. The shaft 57 is coupled as at 144 with a pulley 142, see Figs. 5 and 11, which in turn is coupled with the compressor drive shaft 143. The compressor has been somewhat diagrammatically shown, because the structure and operation of such compressors are well known. The systems served by such compressors vary considerably as to size and complexity, but are generally well known, and therefore the entire system has not been shown herein. However, Freon cooling systems include an evaporator, condenser, receiver, and piping connection for the hot and cold gas, for hot and cold liquid, fans, and suitable pressure and temperature controlled valves and switches, and electrical control circuits. In this invention the solenoid 120 for shifting transmission clutch ring 55 for controlling compressor drive is controlled by a suitable thermostat, or by a plurality of thermostats in electrically parallel relation and responsive to space or room temperature. Such a thermostat which may be of any preferred kind is symbolically represented in circuit in Figs. 12 and 23 at 145, and is adapted to act to energize solenoid 120 on a call for cold, and to de-energize it when that call has been satisfied, whereby to operate the compressor when refrigeration is needed and to stop such operation when not needed. The compressor is provided with the usual pressure safety switch (not shown) which can stop compressor operation independently of the control by solenoid 120. The clutch element 50 is constantly driven when shafts 3 and 28 are driven. The compressor 141 is shown as mounted on a horizontal shelf 146 attached to the frame 136 close to the casing of the speed regulator. The discharge valve of the compressor is indicated at 147 and the suction valve at 148.

The pulley 142, see Fig. 11, is connected by a suitable belt 150, with a pulley 151, keyed to a short shaft 152 rotatable in bearing structure 153, secured to the bottom of a structure, not illustrated but represented by a dot and dash lines 154.

The structure 154 encloses blowers of an air conditioning system (not shown), and terminally of this structure 154 are attached bearing structures 155, 156, see also Fig. 12. These structures 155, 156 are identical except that they are made in rights and lefts. Each has a shaft rotatable therein, and these shafts are respectively designated 157, 158. Bearing structure 155 also provides a bearing for a shaft 159, which bearing is at the terminal of a slanting extension 160. Structure 156 has a shaft 161 rotatable in a lower terminal bearing of a slanting bearing extension 162. Shaft 157 is keyed to a coupling 163, which is in turn keyed to a shaft section 164. Shaft 164 is coupled as at 165 to pulley 151, which is keyed to shaft 152. Shaft 152 is coupled as at 166 to shaft section 167 in turn coupled and keyed as at 168 to shaft 158. Shafts 157, 159, respectively have belt-connected pulleys 170, 171. Shafts 158, 161, respectively have belt-connected pulleys 172, 173. Each pulley 171, 173 is secured to and drives a hub, one of which is indicated at 175 on Fig. 11, and the other at 176 on Fig. 12. Each hub has fan blades attached thereto, but only herein indicated in dot and dash lines respectively at 177, 178. Each fan operates in a suitable conduit (not shown) but which is part of the air circulating system of the bus.

By means of three pairs of pulleys and the countershaft structure both fans are driven from shaft 57 of the speed-regulating device, which shaft also drives the compressor 141. The couplings 144, 163, 165, 166 and 168 are of well known construction and therefore are not described in detail. Such couplings facilitate assembly, and ease torsion strains incident to sudden starting and stopping actions, since they include transmitting cushion elements, generally of rubber. For engine speeds ranging between 900 and 1200 R. P. M., the Freon compressor clutch shaft 45 may be driven at from 2400 to 3200 R. P. M., and for engine speeds between 1200 and 2600 the shaft may be driven at from 1480 to 3200 R. P. M.

The location of the hydraulic pump is best shown in Figs. 4 and 6, and parts of the systems served by the pumps are shown in Fig. 22. Two pumps are used and their casings 180, 181 are connected together in axially aligned relation and casing 180 is suitably connected to the adapter 69, see also Fig. 7. The pumps are of a well known vane type and therefore their interior structure is not illustrated. The pumps are operated from a common shaft 73, see Fig. 1, through gear 72 meshing with gear 71 on the shaft 65. For engine speeds ranging from 900 to 1200 R. P. M., the pumps may be operated at from 1500 to 2000 R. P. M. For engine speeds ranging from 1200 to 2600, the pumps may operate at from 920 to 2000 R. P. M. These R. P. M. figures, as all others, are only given as helpful to an understanding of the invention. No limitation of the invention is intended. As used herein pump 180 supplies steering booster pressure, and pump 181 supplies general system pressure for the various requirements such as brake pressure, windshield wiper pressure, etc. Other elements in the system will be hereinafter referred to.

Figs. 4, 5 and 6 show one way in which pipe connections for the pumps can be in part supported on the frame 136. The arrangement can be varied, but Figs. 4 and 5 show a compact arrangement in which portions of the pipe lines are connected to the frame 136. For this purpose a casting 184 is suitably secured by a flange to the frame 136 and has terminally threaded passages to which the ends of threaded pipes can be coupled. The ends of intake pipes 185, 186 are respectively connected with the tops of the pumps 180, 181, and with passages in the casting or bracket 184. These pipes pass over the generators 131, 132. From the passages of the casting 184 pipes 187, 188 connect with the reservoir 190, see Fig. 22, and through them fluid is returned from the reservoir to the pumps. The delivery pipes 191, 192 lead from the bottoms of the pumps, and are respectively connected to pumps 180, 181. The opposite ends of these pipes connect with threaded passages of the bracket 184. These pipes pass beneath the generators 131, 132. From these passages lead pipes 193, 194 respectively for supplying steering booster pressure and for supplying general system pressure.

*Engine-speed regulated control for the accessory-speed regulator device*

The purpose of the engine-speed controlled accessory speed-regulating scheme of this invention now to be described is to normally operate the accessories at or near their most efficient and economical speeds by means of an engine, operating at a constant relatively low speed (900 R. P. M. in the example), and to provide means by which at higher engine speeds a shift of driving ratio is made to prevent overspeeding. The purpose is then to control accessory drive speed ratio in such manner that the accessories will be efficiently operated at an engine R. P. M. of 900, but will not be overspeeded when engine speed rises above 900 R. P. M. and while it continues to rise to 2600 R. P. M. To ultimately prevent over-acceleration at high engine speeds we provide for a temporary speed "step down" change of gearing drive ratio, as the result of which accessory speeds may be temporarily reduced, for example, to one-half of their normal or rated speeds, so that as engine speeds continue to increase up to maximum speed, accessory speeds will be correspondingly increased without overspeeding.

One phase of this invention involves, in combination with our accessory drive regulator device, the use of an engine, which can simultaneously drive both the vehicle and the accessories and which has an engine speed-responsive clutch which enables the engine to automatically transmit vehicle driving torque only when engine speed rises above a given R. P. M., but at or below which speed the engine has power sufficient to properly drive all accessories. In one phase of this invention, when the speed of the engine rises above said R. P. M., means, which may be shaft-controlled, and which is responsive to engine speed, operates the intermediate accessory speed-regulating device to temporarily reduce accessory drive speed.

It is also contemplated herein to have either of two engines power the accessories, while at the same time powering the vehicle, and to provide shiftable means which is operable to cause either engine to drive the vehicle and the accessory speed regulator, and shifting of said means is adapted to open the circuit to solenoid 108, or to otherwise open clutch 37, when the shift is made in one direction, whereby to allow the speed of the accessories to follow the speed of the engine to which the shift is made.

To illustrate one way in which the above new functions can be carried out, we have shown in Figs. 13 to 17, inclusive, parts of a mechanism shown in the aforementioned copending application, Ser. No. 737,976, filed March 28, 1947, which can function for carrying out certain phases of the present invention. This illustration includes, see also Fig. 10, a two-engine vehicle driving system, as well as a system of carburetion in which part of fueling of the system is engine-regulated to operate the engine at low speed with power sufficient for driving only and all accessories, and in which another part is manually controllable to augment engine speed and power for simultaneously driving the vehicle and the accessories.

Fig. 10 is a somewhat diagrammatic plan section illustrating how at least one engine is adapted to drive only the accessories or drive the accessories and the vehicle simultaneously. There is also here illustrated two engines, either of which can drive the vehicle and the accessory-regulating device of this invention simultaneously. Figs. 14 to 18, inclusive, illustrate in more detail some of the devices of Fig. 10.

Now referring to Fig. 10. The numeral 200 indicates a shaft which drives the wheels (not shown) of a vehicle. This shaft is connected at its forward end with the power input shaft of any suitable form of transmission mechanism generally indicated at 201. The transmission output shaft 202 is suitably connected through a propeller shaft (not shown) with any preferred rear axle drive for the wheels.

Arranged at opposite sides of the shaft 200 and with their crank shaft axes aligned in a direction transverse to the shaft 200 and to the long axis of the vehicle, is an engine 203, which may be designated as the main or first engine for normally driving the vehicle, but not driving the accessories, and an engine 204 which may be designated an auxiliary or second engine, adapted for normally driving only the accessories but having surplus power for assisting the main engine in driving the vehicle while at the same time driving the accessories, or for alone driving the accessories and the vehicle at the same time. These engines may be of any preferred and suitable type, but the engine 204 has a special carburetion system believed unique in this art, as means for selectively controlling engine power and speed in relation to an intermediate accessory speed-regulating device. The crank shaft for the main engine 203 is indicated at 205 and the crank shaft for the auxiliary engine 204 is indicated at 206. When we speak of engines of the automotive type, it is to be understood that the engines include all of the usual elements needed for their operation. It will be further understood that, although not all shown, the necessary controlled rods and levers are provided for operating the engines from the driver's station.

The engines are cross-connected by a main casing generally designated 208. The casing provides opposite front and rear bearings 209 and 210 for the wheel driving shaft 200. This casing also provides means rigidly but separately connecting the engines.

Shaft 200 is provided with a bevel gear 211 meshing on the main engine side with a bevel gear 212, and on the auxiliary engine side with a bevel gear 213. The bevel gear 211 has a tubular shaft 214 which is stepped in a bearing 215 of the main casing and is also rotatably stepped in a bearing 216 of the crank shaft 205 of the main engine. This shaft 214 is therefore so arranged that it can rotate independently of the main engine, and so that the main engine can operate without rotating it. In order to transmit power from the engine to the hollow shaft 214, a clutch 217 diagrammatically shown is provided. This clutch is associated with the flywheel 218 of the main engine. One of the clutch disks, not shown in detail, is attached to the tubular shaft 214. The clutch 217 may be of the ordinary type, and is manually controlled by the driver through the usual foot pedal (not shown) in the usual manner of clutch control for engines of the automotive type.

The bevel gear 213 has a tubular shaft 220, see also Fig. 17, stepped in bearings 221 of the case 208, and in bearings 222 of the crank shaft 206 of the auxiliary engine. The auxiliary engine can run without operating the tubular shaft 220. The shafts 200, 214 and 220 are thus so geared together that rotation of any one of the shafts rotates the other two.

In one phase of this invention a single engine automatically transmits torque for driving the vehicle (while at the same time driving the accessories) and this is accomplished herein by the use of a centrifugal clutch associated with an overrunning clutch. The centrifugal clutch is diagrammatically indicated at 223 in Fig. 10, and is associated with the engine flywheel. The structure 223 is shown in detail in Fig. 17, and will be more fully described. When the clutch goes in automatically at a predetermined speed of the engine, the engine transmits torque to shaft 220. The speed at which this centrifugal clutch goes in is, in one phase of this invention, related to the speed at which accessory speeds are temporarily reduced by the action of the accessory speed-regulating device herein.

A clutch disk indicated 224 is secured to the outer race 225 of the overruning clutch generally designated 226. The inner race 227 of this clutch is keyed to tubular shaft 220. Centrifugally acting weights 228 cause the centrifugal clutch to take hold or clutch in, as soon as engine speed exceeds a predetermined speed. It will be understood that in one phase of this invention the engine speed below which the centrifugal clutch goes in is such as to provide adequate power for properly driving all accessories. Thus far there has been described a mechanism including a wheel-driving shaft which can be driven by either engine, or by both engines simultaneously, and so that the auxiliary engine can be operated at low speed for one purpose and at higher speed for two purposes, one of which can be to assist the main engine in powering the vehicle wheels. By having the main shaft 200 and the two hollow shafts 214 and 220 permanently geared together, so that rotation of any one of the three shafts rotates the other two, no extra clutch is necessary.

An important part of this invention relates to the means, see Fig. 10, by which either engine can power a second or output shaft 230, see also Fig. 14, from which the accessory speed-regulating device of this invention and therefore all of the various vehicles accessories can be operated or powered and speed-regulated conformably to varying engine speeds. Thus in one phase of the invention part of the power of the auxiliary engine is normally used for operating the shaft 230 or its equivalent, and in an emergency additional engine power is used to power the shaft 200. The shaft 230 is connected, see Figs. 6, 13 and 2, to shaft 17 by means of a suitable shaft 241 and universal joints as shown.

To power the output shaft 230 for driving all accessories, the main engine has a shaft 231 which is keyed as at 232 to the crank shaft 205, and this shaft 231 passes through the hollow shaft 214 and is stepped in a bearing 233, carried by the hollow shaft 214. The specific arrangement of this bearing 233 for tubular shaft 214 is like that shown in Fig. 17 for the functionally similar shaft 220 of the auxiliary engine. The inner end of the shaft 231 has a spur gear 235 meshing with an idler gear 236 in turn meshing with an idler gear 237 in turn meshing with a gear 238 which is rotatable on the terminal output shaft 230. This outer terminal gear 238 of the train has a clutch member 239 engageable by a shiftable tubular clutch element 240 splined to the output shaft 230. In Fig. 10 the shiftable clutch 240 is released from the clutch member 239.

Stepped in the crank shaft 206 of the auxiliary engine is a shaft 243 functionally similar to the shaft 231. The shaft 243, see also Fig. 17, is keyed as at 244 to the crank shaft 206 and passes through the hollow shaft 220 and is stepped in a bearing 245 in said hollow shaft. Fixed to the outer end of the shaft 243 is a gear 246 meshing with an idler gear 247 in turn meshing with a gear 248 rotatable on output shaft 230. This gear 248 has a clutch member 249 and in the drawing the shiftable clutch member 240 is engaged therewith so that shaft 230 will be driven by the auxiliary engine 204. The shiftable clutch member 240 may assume a neutral position, in which case the output shaft 230 will not be driven.

In one phase of this invention, the shiftable clutch element 240, or an equivalent means which is operated to obtain transmission shift, or which is moved when transmission shift occurs, acts to open the circuit to solenoid 108, as the shift is made, see Figs. 13 and 16. This phase will be more fully described.

The gear trains shown in Fig. 10 functionally correspond to means by which the power of either engine can be transmitted to a common power output shaft from which the accessories are driven, either directly, or preferably through intermediate gearing. However, the preferred means by which the shaft 230 is driven is shown in Figs. 14, 15 and 16, and is described hereinbelow in detail. The output shaft 230 is always driven in the same direction, whatever engine may be powering it, and this is also true of shaft 17. In all cases the rotation of the output shaft 230 can be stopped by shifting the lever shown in Figs. 16 and 14 to the central or neutral position in which neither clutch is engaged. In both cases the output shaft 239 can be operated from either engine.

Automatic clutch means

The detail of a preferred form of automatic clutch 223 is shown in Fig. 17 and is particularly useful as an element in our invention herein, wherein one or two engines may be used, and in which part of the power of one of the engines is used to power the accessory speed-regulating device, and in which its surplus power can be intermittently used to assist the other engine in driving the vehicle wheels. This centrifugal clutch is adapted for transmitting torque for driving the vehicle, when engine speed rises to an R. P. M. above which (except for the accessory speed-regulating device herein) the accessories might be overspeeded. Now again referring to Fig. 17. To automatically transmit power the hollow shaft 220 by the auxiliary engine, a multiple clutch mechanism surrounds and acts upon the tubular shaft 220. This multiple automatic clutch means comprises two clutch components or elements, one acting through and in part mounted on the other, one the centrifugal clutch 223, and the other the overrunning clutch 226. The casing 208 has a bell-like housing which is bolted to the flywheel housing 250 of the auxiliary engine 204. The flywheel is indicated at 251 and it is suitably bolted to crank shaft 206 as shown.

Overrunning clutch component

The overrunning clutch now to be described has a structure and action substantially the same as shown in Fig. 3. Splined to the hollow shaft 220, as at 252, is the tubular inner race 227 of the overrunning clutch. A series of clutch blocks 253 are adapted to rock and obtain wedging clutch-in action against the outer surface of the inner race and the inner surface of an outer tubular race 225. The outer race is mounted on two ball bearing structures 254 carried by the inner race 227. The clutch blocks are here in release position, as they are in Fig. 3. When the rotative speed of the outer race 225 becomes greater than that of the inner race 227, the blocks 253 are rocked and clutch-in action occurs and the hollow shaft 220 is driven.

Each rock-block has lateral grooves, one in each opposite side, and circular constrictive springs lie in grooves, one at each side of the circular series of blocks in the same manner as shown in Fig. 3. This clutch mechanism per se is not claimed herein, but only its particular functional relation to the other elements of the combination. Any suitable type of overrunning clutch can be used. The outer race 225 of the overrunning clutch has a circumferential disk-like flange to which is suitably attached the clutch plate 224. This clutch plate carries suitable friction rings at opposite sides, respectively for engagement with the corresponding clutch surface of the engine flywheel 251 and with the clutch surface of a clutch ring 256 of a centrifugal clutch mechanism now to be described. It is noted that the overrunning clutch, with its clutch disk, is a unit which can be separately assembled on shaft 220 and this is also true of the centrifugal clutch unit now to be described. The entire overrunning clutch unit with its friction disks is free to move axially in either direction on the shaft 220 for engagement and disengagement of its disks with the clutch surfaces of flywheel 251 and of ring 256.

Centrifugal clutch component

The centrifugal clutch, as a unit, includes a cover casing 257 on which the parts are mounted. This casing is secured to the engine flywheel 251 by bolts 258, so that flywheel speed controls clutch operation. The casing 257 has an annular hub 259 through which the tubular shaft 220 freely passes. Between the inner side of the casing 257 and the clutch plate 224 are disposed two rings, one the clutch ring 256, previously mentioned, and the other a power ring 261 adapted to be moved toward the clutch ring 256 and to apply a proper pressure thereto through a circular series of compression springs 262 only one of which is shown. Power for closing the clutch is applied through these springs. Sockets of ring 261 receive these springs and they are centered around projections of the ring 256 as shown. The ring 261 is provided with six recesses 263 in its outer face, into which parts of toggle systems (described below) project.

The rings 256 and 261 are mounted on the casing for axial movement and for rotation with the casing as rotated by the auxiliary engine flywheel 251. Means, such as springs 265, is provided for retracting the rings, to the clutch-open position shown in the figure. Means is also provided for adjusting the tension of the springs 265. The means for retracting the rings includes six bolts 266, each having an inner terminal in threaded engagement as shown with the clutch ring 256. The power ring is slidable on these bolts, the ring having cylindrical bores 267 for this purpose. On each bolt is an adjustable stop nut 268 engageable with suitable threads on the bolt. By adjusting these nuts the tension of the springs 262 can be varied. The bolts 266 extend outwardly through thimbles 269, one thimble for each bolt. Each thimble is mounted in an opening of the casing 257. A spring 265 surrounds each bolt and is contained in the thimble. Each spring is under compression between the inner end of the thimble and a spring tension adjusting nut 271 threaded on the bolt 266. The six springs 265 act to retract both rings, that is, move them in unison to clutch-out position, and also act to yieldably force wedge surfaces 272 of wedge plates on the ring 261 toward wedges 273 and toward companion wedge surfaces 274 of wedge plates carried on the inner face of the casing 257.

Rings 256 and 261 are centered with respect to the rotative axis of tubular shaft 220 and connected to rotate with the casing 257 by means of six bolts 275 passing through the cylindrical wall of the casing 257 and held by suitable nuts. Each bolt has a rectangular enlargement 276 which abuts and projects radially inwardly from the inner surface of said casing 257. Each enlargement 276 is disposed between and has opposite faces slidably engaged with opposed flat surfaces of a pair of axially extending lugs 277 of the ring 256. The outer surfaces of each pair of lugs 277 are similarly slidably engaged with the opposed surfaces of a corresponding radial notch 278 of the ring 261. Thus, the rings are centered and are free to move axially but must rotate with the casing 257 and, therefore, with the flywheel 251.

Centrifugal control mechanism

The centrifugally operable mechanism for acting automatically to force the ring 261 toward the ring 256 to cause the latter to clutch-in by forcing the facings of clutch ring 224 against the clutch surface of the flywheel includes springs and weights and wedges. There are six arcuate wedge plates 280, each providing a wedging surface 272, and these plates are removably secured as by screws to the ring 261. Six corresponding and opposed and arcuate wedge plates 281 provide the wedging surfaces 274 and these plates are detachably secured by screws to the inner face of the casing 257. There are also six wedge blocks 273, one for each pair of plates, and each wedge is separately controlled by a weight-actuated toggle mechanism. For this control each wedge has pivoted thereto at opposite sides, as by a pin 282, two links 283. These links are in turn pivovted by a pin 284 to three links, two of which as a pair are indicated at 285. The links 285 are in turn pivoted by a pin 286 to an inner radial projection of the hub 259 of the casing 257. The pin 284 forms a pivot for one end of a third link 287 which passes freely through an opening in the casing 257. The link 287 is pivoted by a pin 288 between fork elements of the short arm 289 of a bell-crank lever, pivoted by a pin 290 between a pair of lugs projecting from the outer face of the casing 259. The long arm 291 of the bell-crank lever has at its outer end the weight 228 previously mentioned.

Each weight 228 has connections by which it acts centrifugally to compress a pair of coiled springs, when the weight moves under centrifugal action, as when the speed of the engine is sufficiently high. It may be assumed as an example only, that the weights begin to act on the toggles to move the wedges to cause clutch-in action, when auxiliary engine speed exceeds 900 R. P. M., which speed is substantially below its maximum speed rate which may be 2600 R. P. M.

Pivotally connected by a pin 293 to the long arm 291 of the bell-crank lever are two links 294, only one of which is shown. More detail of this mechanism is shown in a co-pending application, Ser. No. 763,064, for Clutch Mechanism. The upper ends of these links are pivoted to a pair of pins 295, each integral with and projecting laterally from a slide head 296. Each head has a spring-centering projection, not shown, and the heads are slidably guided on two parallel rods, not shown. Each rod is stepped in an opening of a radial projection of the hub 259 where it is held by a pin. At the opposite end, each head-guiding rod is stepped in a sleeve exteriorly threaded and having a projection engaged in an opening of the shelf 299 of a bracket 300 suitably bolted to the outer face of the housing 257. Each guide rod passes through a tubular spring guide. Each guide is in threaded engagement with the threads of a sleeve. The lower terminal of the spring guide is flanged. A compression spring 301 surrounds each guide rod and spring guide and at one end abuts the shelf 299, and at the other end engages around a centering projection of the slide head 296 and abuts the head and forces it to its uppermost position against a stop surface 302. The springs thus act, through the link system, to retract the wedges to the position shown in the figure, and the springs are under initial compression for this purpose. The weights move under centrifugal action against spring tension until they finally assume a position in which links 283, 285 are aligned on line 304, at which position wedging action is at its maximum, and the clutch is fully engaged. Outward motions of the weights are limited, at this aligned position of the links, by an adjustable stop screw 305. Here it is to be noted that in this limit or clutch-in position the short arm 289 of the bell-crank lever enters between the links 294, the total width of the arm 289 in relation to the axial spacing of the links 294 permitting this entry.

The action of the centrifugal clutch is as follows: With the parts positioned as in the figure, and when engine speed rises sufficiently, the weights act centrifugally against the action of the springs 301 to move the toggle system to the right to straighten the toggles and drive the wedges outwardly in radial direction. This radial drive of the wedges results in movement of ring 261 to the left, during which movement the circular series of springs 262 are compressed to drive the disk 256 against the friction rings of plate 224 and in turn driving these rings toward the clutch surface of the flywheel 251.

When auxiliary engine speed is sufficiently reduced the toggles move to the left from the line 304, again to the position of the figure. This involves movement of the wedges in an inward radial direction, and de-compression of the springs 262 and movement of the rings 256, 261 to the right under action of the springs 265. With this movement the plate 224 is released and the outer race 225 of the overrunning clutch is no longer positively driven.

While any suitable clutch may be used, yet the centrifugal clutch above described is particularly suited for use as an element of a combination herein, wherein, for one phase of the invention, engine "clutch-in" speed may be closely related to the speed at which temporary lowering of accessory drive speed is to be accomplished. In any event, we believe it helpful to include some of the characteristics which this clutch may advantageously have. For example, the clutch may be considered to always remain open at 900 R. P. M. engine speed. Clearance between the clutch surfaces may be taken up at 950 R. P. M. Facing pressure to transmit adequate torque of about 325 foot-pounds may be had at 1140 to 1160 R. P. M. according to the degree of wear of the clutch facings. Maximum facing pressure of 2865 pounds may be had at about 1400 R. P. M. when the facings are new and 2220 pounds' pressure at 1350 R. P. M. when the facings are worn. The pressure cannot become greater than 2865 pounds even at higher engine speeds because after the toggles have assumed the position indicated by line 304 no more wedging action can occur, and at this time weights 228 are engaged with their stops 305.

No matter what kind of transmission clutch may be used to cause vehicle-driving torque to be transmitted through the overrunning clutch, automatic transmission of such torque to shaft 220 can only occur when outer race speed exceeds inner race speed, and the shaft 220 can never drive the auxiliary engine through that clutch when wheel-driving shaft speed is greater than outer race speed. If the speed of shaft 220, and therefore the speed of the inner race, exceeds that of the speed of the outer race (even though the centrifugal clutch is closed), the auxiliary engine cannot be driven through shafts 200 and 220 whether they are driven by the vehicle or by the main engine. The wheel-driving shaft 200 is free to rotate in wheel driving direction when the transmission clutch of engine 204 is out and the engine is operating, and when said transmission clutch goes in, no drive of the shaft 200 through the overrunning clutch can occur until engine speed is such as to rotate the outer race at greater speed than the inner race or shaft speed. Thus engine power can be transmitted to shaft 200 smoothly and without jar. Moreover, free wheeling through shaft 200 in relation to the auxiliary engine 204 can be had at all times except when the auxiliary engine drives the outer race of the overrunning clutch at a greater speed rate than that of the inner race.

It may be said that one or the other of the automatic clutch components acts to prevent one engine from driving the other, and that both components must act together for transmission of torque by the auxiliary engine for assisting the main engine in driving the vehicle wheels.

*Tower casing and mechanism thereon*

The mechanism now to be described, see Figs. 14, 15 and 16, is the preferred means for driving the accessory speed-regulating device from either engine through shaft 230, and includes the functional equivalent of shiftable clutch 240 of Fig. 10. This mechanism is a unit, and includes a casing 310 which is detachably secured to the top of the main casing 208. The gears of this unit are adapted to be meshed with gears 235 and 246, during movement of the unit toward the final position at which it is secured to the casing 208. Thus the unit can be easily and quickly applied or removed. The unit carries the output shaft 230 and clutch mechanisms by which said shaft can be driven by either engine.

One arrangement of gear trains has been indicated in Fig. 10, and previously described. In the preferred form, spur gears 235 and 246 are driven respectively by shaft 231 of the main engine, and shaft 243 of the auxiliary engine. The tower casing 310 is detachably secured to the top of the main casing 208 by suitable bolts, but however secured it can simply be lifted off to disconnect its gear mechanism from gears 235 and 246 and give access to the interior of the main casing. Assembly is equally simple. The main casing has an opening 311 in its top wall and the tower casing is open at its bottom as at 312 and thus when assembled there is a continuous chamber formed by the main and tower casings, the chamber extending the full height of both.

Journaled in the casing 310, see Fig. 15, are two axially aligned shafts 314, 315. Each shaft is supported at its inner end on a roller bearing, the said bearings being respectively indicated 316, 317, said bearings being held in a suitable cross-web member 318 supported by opposite walls of casing 310. Each shaft is also stepped at its outer end in a roller bearing and these bearings are respectively indicated 319 and 320 and each of these bearings is held in a removable bearing-carrying structure 321. These structures are substantially identical and therefore only one is described in detail and the same numerals are applied to each.

The bearing 319 is held in a tubular extension of the bearing-carrying structure 321 which is received in an opening of the upright wall of the casing 310. The structure is suitably secured by bolts. This structure is provided with communicating oil channels leading to the shaft 314. These channels are in communication with a downwardly slanting channel leading from a cup formed integrally with and on the inner side of the upright wall of the tower casing. This cup is drip-fed from an oil-drip opening leading downwardly from a horizontal cross-channel 322 at the top of the tower casing and this cross-channel communicates with the output side of a pump chamber of a pumping structure shown in Fig. 14 by means of a channel shown in dotted lines. Leading from the channel are other oil-drip openings which deliver oil downwardly to the gears and gear shift mechanism now to be described.

Each of the shafts 314 and 315 has an exteriorly toothed clutch disk fixed thereto. The clutch disk of the shaft 314 is indicated at 325. Keyed to the shaft 314 as at 326 is the elongated hub 327 of a bevel gear 328. Rotatable on this hub 327 is the elongated hub 329 of a spur gear 330 which meshes with the gear 246 driven from the auxiliary engine by shaft 220. Axially shiftable on but nonrotatably secured to the hub 329 is an interiorly toothed, peripherally grooved clutch ring 331 held against rotation on the hub 329 as at 332 by engagement of its interior teeth with exterior teeth on the hub. The interior teeth of the ring 331 are adapted to clutch in with or engage the exterior teeth of the disk 325. In Fig. 15 such engagement is shown, so that the gear 330 is connected to the toothed ring 325 to cause the bevel gear 330 to be rotated through the shaft 314. It will be understood that when the clutch ring is moved to the right to disengage its teeth from the teeth of the ring 325 the spur gear 330 will idle and no power transfer to shaft 230 by means of bevel gear 328 will occur.

A construction identical with that immediately above described is provided in relation to the gear 235 which is driven by the main engine through shaft 231. The clutch disk on shaft 315 is indicated at 335. The hub 336 of bevel gear 337 is keyed to the shaft 315 as at 338. The spur gear 339 meshes with gear 235 and has its elongated hub 340 rotative on the hub 336 of the bevel gear, and this hub has teeth thereon cooperating with teeth of the shift ring 341 as at 342. The interior teeth of the shift ring 341 are engageable with the teeth of the clutch disk 335. In the drawing the clutch ring is shown in unclutched position and therefore the spur gear 339 will idle, and bevel gear 337 will not be driven from shaft 231.

Now referring to Fig. 14 which further illustrates the drive for shaft 230, and shows a unit mounting structure for the shaft which facilitates assembly. The bevel gears 328, 337 are both in mesh with a bevel gear 345 fixed to output shaft 230 and one end of this shaft is journaled in a roller bearing 346 at a point near the gear 345. The bearing is held in a tubular extension 347 of a pump case detachably secured to the outer side of the tower casing by bolts 348. The outer end of the shaft 230 is journaled in the roller bearing 349 held in a tubular extension 350 of a cover 351 for a pump case 352, which cover is also held by the bolts 348. The shaft 230 has keyed to its outer end a fork element of a universal joint, the other element of which, see Figs. 6, 2 and 13, is connected to the shaft 241 in turn connected by a universal joint to the input shaft 17 of the accessory speed-regulating device.

One of the oil pump gears 353 is keyed to a sleeve in turn keyed as at 355 to the output shaft 230. The other pump gear 354 rotates about a stub shaft suitably stepped in the pump casing cover 351. By means of suitable conduits, not all herein shown, oil is drawn from the bottom of the main casing 208, as a sump, and is distributed to the various parts in the tower and main casings.

The grooved clutch rings 331, 341 are shifted by a mechanism best shown in Figs. 14 and 16. Fig. 16 is schematic, viewing the mechanism from line 16—16 of Fig. 14. This shift mechanism comprises a horizontal rod 358 fixed in openings of the walls of the tower casing 310. Slidable on this rod is a pair of shift members 359, each having a fork 360 slidably entering the groove of a corresponding clutch ring. At a point on the rod between the shiftable members is a shiftable block 361 having a socket 362 which receives the ball of a shift arm 363 secured to a shaft 364 journaled as at 365 in the slanting wall of the tower casing 310. Springs 366 and 367 are interposed between the block 361 and the shift members 359 to obtain cushioned but positive clutch-in action. A hand lever 368 is fixed to one end of the shaft 364 and is adapted for engagement with notches 370, 371, 372 in an elongated projection 374 integral with the wall of the tower casing. Stops 375 limit shift members 359 at clutch-in positions.

In Fig. 16 the hand lever 368 is positioned in notch 370 as when the auxiliary engine is transmittably connected to the output shaft 230, also see Fig. 15. This lever may be shifted to the middle notch 371 to disconnect all engine power from the shaft 230. When the lever is in the notch 372, the output shaft is adapted to be driven from the main engine through the spur gears 235, 339 and bevel gear 337. The shaft 230 with its bearings and the pump gears constitute a unit, bodily separable from the tower casing 310 just as the tower unit casing 310 is bodily separable from the main casing 208.

In Fig. 16 the dotted position of the hand lever 368 has been shown in relation to an electric switch which is part of means for controlling the accessory speed-regulating device of this invention, which means is later described. It will be understood that this switch or its equivalent may be made to respond through means other than a hand lever for controlling the regulating device in relation to transmission shift, see also Fig. 13.

We believe it is new in conception and in structure to drive all accessories through an engine speed-controlled, accessory speed-regulating device. We also believe it new to so control all accessories, or a plurality of the same through the intermediate gearing and shaft combination herein, and/or to detachably mount the accessories on a gear casing. We have detachably mounted the power elements of the accessories on a single casing so that they are easily accessible for inspection, and for removal and replacement. The power input for the seven accessories is controlled from a primary shaft through two clutches, and each of the clutch shafts directly drives an electric generator. One shaft drives the fan pulley of a cooling system as well as the Freon compressor of that system. Another shaft drives an air compressor and two hydraulic pumps.

We also believe that our conception is entirely new, of alternately driving two intergeared shafts either through the other, by the use of interdriven clutches, in which one of the clutches is engine speed-controlled. We also believe it is new in conception to alternately drive two shafts one through the other, and first to drive the shafts at their proper speeds when engine speed is low, and then as engine speed rises to a predetermined R. P. M., to lower temporarily their driving speeds so that as engine speed continues to rise thereafter to its maximum speed, the accessories will not be overspeeded.

We also consider that we are the first to conceive of a way to mount electric motors, pumps, and other accessory power elements on a single casing and to find a way to arrange shafts and gearing for driving the aforesaid accessory power elements, and also the first to conceive of a way by which the said elements can be properly driven at their proper speed from a shaft which is driven at speeds which vary substantially. We also believe we are the first to find a way to power all accessories from an engine through a single shaft, by the use of a mechanism which is engine-governed to change gear ratios back and forth conformably to rise and fall in engine speeds.

*Coordinated control of engine carburetion*

Referring now to Figs. 13 and 18. An important distinct phase of this invention is related to the conception of coordinately controlling the carburetion system of an engine, so that the system can be operated by engine-regulated means for a lower power output for driving only and all accessories, and so that this engine-regulated means can be overridden to cause carburetor operation of that same engine for higher power output, for driving or assisting in driving the vehicle, or for other purposes.

In the present disclosure, see Fig. 13, three carburetors are shown, two on one engine, and one on the other, but there is no intention to limit the broader phases of the invention to any particular number of carburetors, since the gist of one phase of the invention is the control of carburetion of one engine in relation to speeds required for effecting a proper accessory speed regulation by means of an intermediate device from which the drive of all accessories is controlled.

The carburetion system and its control as shown and described herein, is in part substantially like that shown in the aforementioned co-pending application, Ser. No. 737,976. For full detail, that disclosure may be referred to. Referring to Figs. 13 and 18. The main engine 203 has a carburetor 380 and the auxiliary engine has a carburetor 381. These carburetors may be referred to as large, in contrast to a carburetor of smaller fueling capacity which is automatically engine-regulated for operation of the auxiliary engine at a lower power output, for powering only the accessories. These large carburetors have been diagrammatically shown and may be of any suitable type. The carburetor 380 has a butterfly valve on a shaft 382, said shaft having an arm. The auxiliary carburetor 381 has a butterfly valve on shaft 383 having an arm. Normally the butterfly valves of both carburetors are initially closed, but in one phase of the invention carburetor 380 can be operated at almost full capacity before the valve of carburetor 381 begins to open.

The carburetors 380 and 381 are coordinately operated from a single element, such as a pedal, by the driver. The shafts 382 and 383 are shown herein as connected by suitable linkages to cam-operated shafts 384 and 385. The cams are indicated in dotted lines at 386 and 387, and are cross-connected by, and fixed to a common shaft 388 rotatable in housing 389 and 390 which enclose the cams. The shaft 388 is operated by an arm 391, connected by suitable linkages with the driver's pedal. As the driver depresses the pedal from its initial position, carburetor 380 is first brought into action, then later carburetor 381 is brought in.

The specific manner of operating carburetors 380 and 381 in relation to each other is less important herein, than is the manner of operating carburetor 381, in relation to the small carburetor 395 which is engine-regulated. The operating arm 396 of a conventional engine-regulated-arm designated 396 is shown in Figs. 13, 18 19 and 20. Neither the specific structure of the regulator nor its mechanical connections with the engine has been shown, because they may be of any preferred well known type. The governor can be mounted and engine-connected in any suitable way. It may be disposed on the side of the motor and put in gear with the cam shaft, or the governor case can be mounted between the carburetor and the intake manifold and driven by a shaft from any convenient driving outlet in the flywheel housing, or the governor can be mounted on the front of the timing gear housing and driven directly from the timing gear, or it can be driven from a gear on the generator shaft which, in turn, is driven from the timing gear.

The arm 396 is shown in Fig. 18 as connected to a cross-shaft 397, and this shaft is represented in Figs. 19 and 20. Any suitable means symbolically represented at 398 is engine speed-controlled to rock the shaft 397, and therefore the arm 396, for the purposes herein. The arm 396 not only controls the small carburetor 395, but also controls a switch 400, see Figs. 13 and 23, which is part of the electro-mechanical means, by which engine speed controls the accessory speed-regulating device of this invention always to operate the accessories at proper speeds, notwithstanding speed fluctuations of the engine. The electro-mechanical means and the circuits therefor are described herebelow. The arm 396 opens the normally closed switch 400, when engine speed reaches an R. P. M. at which appropriate operation of the accessory drive-regulating means is necessary to prevent overspeeding, as engine speed continues to rise.

The arm 396 acts to close the small carburetor 395 when auxiliary engine speed exceeds, for example, 900 R. P. M., and this arm is shown in its initial or throttle-open position in both figures. The quantitative variations in the amounts of fuel for operating the engine at different speeds are taken care of by the operative relations of the large and small carburetors 381 and 395. These relations are such that fuel is constantly fed to the auxiliary engine, during switch-over from one carburetor to the other. As viewed in Fig. 13, the regulator arm 396 moves in clockwise direction to close the small carburetor. The arrangement is thus such that on starting the auxiliary engine, engine speed may rapidly rise to 900 R. P. M. For this purpose the regulator arm 396 is connected by a link 401 to one arm of a bell-crank lever 402 which is pivotally mounted on a suitable bracket 403 carried by the engine. The opposite arm of this bell-crank lever is pivotally connected to a link 404 which, in turn, is pivotally connected to a bell-crank lever 405 which is pivoted to a bracket 406 on the top of the intake manifold 407 of the auxiliary engine. The opposite end of this bell-crank lever 405 is connected by a link 408 to arm 409. This arm 409 is connected to a shaft 410 which operates the butterfly valve 411, shown in dotted lines in both figures. The small carburetor is somewhat diagrammatically indicated, and may be of any preferred type.

In Fig. 13 the arm 396 moves from the position shown in clockwise direction to close the throttle of the small carburetor when auxiliary engine speed exceeds 900 R. P. M. By having the carburetor promptly open when the auxiliary engine starts, the engine promptly delivers all of the power required for the operation of all the accessories. When it is desired to have the auxiliary engine assist in powering the vehicle, acceleration of that engine by the use of the large carburetor 381, to bring auxiliary engine speed above 900 R. P. M. causes prompt closure of the small carburetor through its regulating device. On the other hand, as soon as the need for the use of auxiliary vehicle-driving power ceases and the operator closes the throttle of the large carburetor 381 of the auxiliary engine and engine speed is reduced to 900 R. P. M., the small carburetor is promptly opened by the regulator and the auxiliary engine continues to operate only on the small carburetor to drive all accessories.

In the illustration two separate carburetors have been shown for engine 204, and an engine-regulated carburetor is closed when the manually operable carburetor takes over. However, it is conceivable that for carrying out the broad function of providing one degree of carburetion for normally driving the accessories at constant speed, and providing a greater degree of carburetion for driving both accessories and vehicle, carburetion can be obtained by other equivalent means, and therefore there is no intention to limit the broader aspect of the invention to the specific disclosure although these are also claimed. A large capacity carburetor can be used and operated at low capacity by engine regulation, for powering the engine at low speed for driving only the accessories, and can then be operated at higher capacity for augmenting engine speed and power for driving both accessories and vehicle. In any event carburetion can be controlled for one purpose or for both purposes by means of a single carburetor or its functional equivalent.

By the use of this invention the engine can normally provide adequate power for all accessories at their rated speeds at a minimum cost with a relatively fully open carburetor and by using a relatively small amount of fuel, and then when a larger amount of fuel is temporarily needed for greater power and engine speeds for handling larger loads, carburetion capacity can be increased in a suitable manner as by the action of the second part of suitable carburetor means and if desired while the first part of said means continues to supply fuel.

By the use of engine governor-regulated carburetion on the auxiliary engine 204, accessory speed is normally automatically kept substantially constant. We provide for the manual interruption of transmission of power to the accessories on failure of the accessories per se, and also provide for driving the accessories by means of the main engine 203 in case of failure of the auxiliary engine. The usual manual means, not shown, are provided for controlling the main engine clutch, and additional means associated with the manual control means may be provided for locking the main engine clutch in open position in case of main engine failure. In case of such failure surplus power of the auxiliary engine can be transmitted for driving the vehicle, while at the same time this engine can drive the accessories.

In the preferred form, the auxiliary engine operates at an economically high load factor and therefore with good fuel economy, at relatively low constant speed on an engine governor-regulated carburetor for powering the accessories, thus requiring no manual attention except for starting the engine. The same engine can also be operated on another manually-controlled carburetor for power output speeds above that required for driving the accessories, when transmission of its surplus power is needed to assist the main engine in powering the vehicle. Thus in one phase of the invention, accessory speed only varies under emergency conditions, that is, when the auxiliary engine is being accelerated or operated in its higher speed and power range.

*Means for temporarily interrupting engine-regulated control of the accessory speed-regulator*

Another feature of this invention includes means by which the electro-mechanical control of the accessory speed-regulating device can be interrupted temporarily when a transmission shift is made, as by movement of lever 368 to the dotted line position of Fig. 13. By such a movement the drive of the accessories by engine 204 is interrupted and is transferred to engine 203. Such a transfer is usually only necessary when engine 204 becomes inoperative, and it becomes necessary for engine 203 alone to drive the vehicle and the accessories. In emergencies, as when engine 203 alone drives the vehicle and the accessories, the electro-mechanical control of solenoid 108, may be inadvisable. Nevertheless, we provide means which can be optionally used for putting an engine regulator-controlled switch of engine 203 in the circuit with the solenoid 108, which controls shifting of clutch 37 to obtain accessory speed regulation. When this circuit relation for the switch is established, engine 203 controls the solenoid in the same manner as it is controlled by engine 204.

We will now describe the means by which the solenoid 108 is normally controlled by engine 204, and how solenoid 108 can be optionally controlled by engine 203, during emergencies, if engine speed fluctuates considerably. Such control will not ordinarily be needed when engine 203 is operated constantly at high speed under heavy load in low gear over long periods of time. Referring to Fig. 13. The structural details of the switches 400 and 415 have not been shown, but their principal characteristics are diagrammatically shown in this figure, in which for switch 400 the two contacts and spring 414 for holding the switch normally closed, are represented. The second switch 415 is also placed in the circuit of clutch-shift solenoid 108. The circuit includes a grounded connection 416 for one contact of switch 400, and a connection 417 from the other contact of switch 400 to one contact of switch 415. From the other contact of switch 415 a connection 418 leads to one terminal of the coil of solenoid 108. From the other coil terminal of solenoid 108, a connection 419 leads to one terminal of a generator 420, or other suitable source of electrical power. In this embodiment the source is one or the other of generators 131, 132. The other terminal of generator 420 is grounded by connection 421. Where only a single engine is used, the switch 415 is omitted and conductor 417 is directly connected with one terminal of solenoid 108.

The switch 415, see Figs. 13 and 16, has been shown in such relation to the shift lever 368, that when the lever assumes that position at which engine 203 is driving the shaft 230, and therefore driving the accessories, the switch 415 is opened to break the circuit to the solenoid 108, with the result that clutch 37 is opened by the throw-out spring 114 and the accessories are thereafter driven by the overrunning clutch 10, 12, driving shaft 3, for a purpose and in a manner previously described. When the circuit is so broken, the operation of switch 400 by the engine regulator arm 396, can, of course, have no effect on the solenoid 108. When reverse shift of lever 368 from the dotted to the full line position occurs, the switch 415 closes automatically to restore circuit continuity to solenoid 108, whereby the solenoid will remain energized as long as the speed of engine 204 remains below 1200 R. P. M. It is to be understood that the opening of clutch 37 may be had at other engine speeds, lower or higher, conformably to accessory speed-regulation requirements.

Ordinarily there will be no control of solenoid 108 by the engine 203 when, in an emergency, it alone drives the vehicle and the accessories. However, such control may be needed and can be had by providing a third switch 424 functionally like switch 400, and controlling this third switch by an engine regulated arm 425, in the same manner that arm 396 controls switch 400. In this case one terminal of switch 424 is grounded by a connection 426, and the other terminal is connected by line 427, through a normally open hand switch 428, with conductor 418, which leads to solenoid 108. When the accessory drive regulating device is to be controlled through switch 424, the hand switch 428 is closed, and since at this time switch 415 is open, accessory speed regulation through solenoid 108 will be solely controlled in relation to the fluctuating speed of engine 203.

The circuit for solenoid 120, which controls shifting of the clutch 54 of the Freon compressor drive shaft 45, includes thermostat 145 and a ground connection 431 for contact 432, and a connection 433 from the terminal of the bimetallic thermostatic element to one terminal of solenoid 120. The opposite terminal of solenoid 120 is connected by conductor 434 to line 419 and thus with grounded electrical power source 420.

In Figs. 19 and 20 are shown specifically suitable means by which the automatically controlled arm 396 of engine 204 is adapted to operate the switch 400. To this end the arm has secured thereto a block 435, in an opening in which a bolt 436 is slidably arranged. A spring 437 surrounds the bolt and urges the bolt to the position shown at which it is limited by stop nuts 438 in engagement with the block 435, as shown. At first the outer end of the head of the bolt is spaced from the button 439 of the switch 400. From this position the arm 396 swings in clockwise direction to cause the head of the bolt 436 to engage the button 439 to open the switch when engine speed is sufficiently high to require de-energization of clutch-shift solenoid 108. One end of a retraction spring 440 is connected with the bottom of the arm 396, as at 441, and the other end of the spring is connected by a link 442 to the casing 443, as shown at 444. This spring 440 acts to return the arm to the initial position shown, when engine speed again reaches 900 R. P. M. At an engine speed of about 1200 R. P. M. the switch button 439 is moved to open the switch 400. The speed at which the engine opens switch 400 may be related to the speed at which the centrifugal clutch 223 of engine 204 operates to transmit torque for driving the vehicle.

Electro-mechanical means for operating the clutch shift ring 38, or its functional equivalent, is believed to be unique as means responsive to engine speed for controlling a speed-regulating device. It is, however, conceivable that operative response to engine speed may be had from a shaft outside of the unit casing, and therefore while the specific means shown is claimed, there is a broader phase of the invention which need not be limited to the specific means shown. Insofar as we are aware, no one has conceived of a unit mechanism for simultaneously regulating the speed of all accessories, nor conceived of a way to automatically control such a mechanism conformably to variations in engine speed, to prevent overspeeding. It is not believed that the speeds of accessories have ever before been regulated from or through a single unit mechanism, nor driven from a single shaft, through such a unit mechanism, with provision for selective clutch shifting, nor been automatically regulated by the use of an overrunning clutch associated with another clutch, nor been regulated by control which is alternately through two clutches. There is no intention to limit this invention entirely to particular engine speeds but only to disclose, by the examples previously given, how the speeds of all accessories may be properly maintained in spite of engine speed variations, and for all engine speeds, and to illustrate the principle of automatic and appropriate shifts of gear ratios or driving sequences.

Generator circuit system

While in relation to the description of Fig. 13 a simple electrical circuit has, for convenience, been disclosed and described, yet the actual circuit used for the various devices of a vehicle such as a bus is much more extensive. This circuit is in practice energized by the two generators 131 and 132, which are mounted on and driven from the primary and secondary shafts of the speed-regulating device. A part of that circuit will now be described. The circuit includes only a few parts of the air-conditioning system but sufficient to show how thermostat 145, or its equivalent, controls shifting of the clutch shift ring 55, see Figs. 1 and 9.

Referring to Fig. 23. Generator 131 has associated therewith a voltage regulator symbolically represented at 447. A load take-off terminal is indicated at 448. From this take-off terminal a conductor 449 supplies a large number of electrically operable devices (not shown) but generally used in bus operation. A grounded defroster motor 450 is supplied from line 449. The terminal 448 is connected with a similar load take-off terminal 451, of a voltage regulator 452 for generator 132. Terminal 453 of regulator 452 is connected by conductor 454, with one end of a grounded coil 455 of a switch 456. One terminal of switch 456 is connected to a terminal 451 by conductor 457, and the other terminal is connected with line 458 which supplies various devices related to this invention and shortly to be referred to. The switch 456 is closed as soon as the generators deliver effective voltage. Line 458 supplies the solenoids 108 and 120 of the accessory speed regulator and drive unit. This line also supplies various devices of the air-conditioning system but only a small part of that system has been shown.

Line 458 supplies two air-conditioning blower motors 459, 460, respectively a constant speed and a two speed motor, through conductor 462 to one motor 459, and to one contact of switch 461, and through conductor 463 from the other contact of said switch to motor 460. The grounded coil 464 of switch 461 is connected by conductor 465 to one end of the thermostat 145, which is symbolic of any suitable single or multiple thermostatic means responsive to changes in temperature to start and stop the compressor of the refrigeration unit of the air-conditioning system, see Figs. 13 and 1. The free end of the element 145 moves to the left on demand for cold and engages the contact of conductor 466 which connects with line 458. When the thermostat closes, the coil 464 of switch 461 is energized. When thermostat 145 closes, grounded coil 468 of switch 469 is energized to close the switch and obtain energization of solenoid 120. For this purpose the element 145 is connected by conductor 470 with grounded coil 468. One contact of switch 469 is connected by conductor 471 with line 458. The other contact of switch 469 is connected by conductor 472 with the grounded coil of the compressor clutch solenoid 120. In practice the whole air-conditioning system is thermostatically controlled through suitable relays, and thermostat 145 is symbolic of any single or multiple means responsive to temperature fluctuations for controlling the compressor 141.

Line 458 also supplies current to clutch control solenoid 108 of the accessory drive and speed regulator unit, through a switch or relay 475. One end of relay switch coil 476, and one contact of this switch is connected by conductor 477 with line 458. The other contact of the switch is connected by conductor 478 with grounded coil of solenoid 108 for operating clutch shift ring 38 of the regulator and drive unit. The other end of the relay coil 476 is connected by conductor 479, with one contact of switch 415. It should be here noted that because of the introduction of the relay 475 in the circuit of Fig. 23, the circuit connections here differ slightly from those of the simplified circuit of Fig. 13. The other contact of switch 415 is connected by conductor 417 with one contact of switch 400, and the other contact of switch 400 is grounded by conductor 416. Switch 475 closes when line 458 is energized by closure of switch 456.

In order that the electrical system may properly and promptly deliver effective voltage, the generators are driven from the primary and secondary shafts 3 and 28, that is, from the clutch shafts, and are initially driven at substantially their proper speeds through shaft 28, just as soon as the engine starts. The engine starts on a small engine-regulated carburetor which is fully open at starting and, therefore, the engine speed promptly rises in the example, to 900 R. P. M., which promptly brings the generators up to substantially full voltage capacity. When the solenoid 108 is de-energized and the oil clutch 37 opens, the speed of the shafts 3 and 28, and, therefore, of both generator shafts, is substantially reduced momentarily, but almost immediately the overrunning clutch goes in and the speed of the generator shafts increases. As engine speed increases, with the overrunning clutch drive continuing the generators are brought up to full rated voltage and, as can be seen by the examples given, they are not substantially overspeeded even when the engine has reached its upper speed limit. This high speed may not be maintained over a long period of time.

Hydraulic system

Reverting to the pressure system supplied by pumps 180, 181, and referring to Fig. 22. This pressure system includes in addition to reservoir 190, an unloading valve 483 on said reservoir, and a filter 484 delivering by pipe 485 to the unloading valve. Pipe 194 from pump 181 delivers to the filter. Valve 483 delivers general system pressure through pipes 486, 487. Return pipes to the reservoir 190 are indicated at 489, 490, and return pipes from the reservoir to the pumps are designated 187, 188. The pumps 180, 181 supply adequate fluid pressure for brakes, steering, and windshield wipers. By reference to Figs. 1 and 4, the location of the pumps on the speed-regulation unit, and their driving relation to the speed-regulating elements of the unit can be seen.

Air compressor and pneumatic system supplied thereby

The location of the air compressor on the accessories drive and speed-regulating unit, and its driving connection with that unit have been previously described. Referring now to Fig. 21. The compressor 135, shown somewhat diagrammatically in all of the figures of the drawing, is of a two-cylinder type, and is driven from shaft 65, see Fig. 1. The compressor supplies air for all pneumatic devices needed in automotive vehicles, particularly the numerous devices of busses, such as for shock absorbing systems, horns, leveling systems, etc.

A screened or filtering air intake structure is indicated 493. Air delivery is from the top of the compressor through hose 494. The hose connects with one end of a cooling coil 495, and the opposite end of the coil is connected by pipe 496 with one side of a carbon trap 497, having a safety valve 498. The opposite side of the trap is connected by pipe 499 with a tank 500. There may be a plurality of these tanks but only one is shown. From the tank (or tanks) air is distributed through various pipe connections 502, 503, 504. A pipe 505 leads from the top of the tank 500 and connects with a pressure governor 506 in turn connected by hose 507 for regulation of air delivery by the compressor. It is noted that the described parts of the pneumatic system are located rearwardly of the rear axle 509 of the vehicle, the outline of part of which is indicated in dot and dash lines at 510.

General operation

To give one example of the power demands and operation of the device herein in response thereto, let it be assumed that each of the engines can develop 150 H. P. at 2600 R. P. M. when the engine throttle is fully open. Then assume that the vehicle is being driven by the engine 203 at 60 M. P. H. over a level road, and that there is a power demand of only 80 H. P. Now assume that the power demand rises to 135 H. P. and that to meet the demand the engine carburetor 380 must be operated at about 90% throttle. Now assume a demand for power output of 200 H. P. for engine 203. The operator acts to operate the carburetor 380 at more than 90% throttle, and thereupon the large carburetor 381 of engine 204 starts to open. When this occurs the speed of engine 204 accelerates sufficiently to operate the centrifugal clutch to transmit torque for vehicle drive. Thus, when maximum power demand occurs while engine 203 is operating at speeds above the accessory drive speed of engine 204, the speed of engine 204 is accelerated on its large carburetor 381. Then the centrifugal clutch engages and then the overrunning clutch engages to transmit power for vehicle drive.

Now, referring to Fig. 1. Assume that the clutches 37 and 54 of the speed-regulator are open, as they are before engine 204 is started. When said engine is started, see Fig. 13, it is fueled by the small carburetor 395. After starting, engine speed promptly rises to 900 R. P. M. and at this speed the generators 131, 132 are driven at 3600. Since the switches 400 and 415 are closed, the solenoid 108 is energized and clutch 37 is closed against the action of its clutch throw-out spring 114, and is held closed by solenoid 108, or equivalent action, until engine speed rises to 1200 R. P. M. At this engine speed the engine-regulated arm 396 opens switch 400 to de-energize solenoid 108, and clutch 37 is opened and accessory drive is thereafter solely through the overrunning clutch 10—12 acting directly on shaft 3. This direct drive by the overrunning clutch continues as engine speed rises. If engine speed is reduced to 900 R. P. M. the governor arm 396 releases switch 400 and the switch closes and solenoid 108 is again energized and clutch 37 is closed and the accessories are driven via shaft 28 as originally.

When solenoid 108 is de-energized, the sequence of drive between the primary and secondary shafts 3 and 28 is, so to speak, reversed according to the speed of the engine-driven primary shaft 3, that is, according to the R. P. M. of the shaft with which the overrunning clutch 10, 12 is associated. In one instance, for lower engine speeds, the overrunning clutch stays out and the drive is through the disk clutch 37 and secondary shaft 28 and around to the primary shaft. The overrunning clutch is thus, so speak, by-passed, at low engine speed. In the other instance, for higher engine speeds the overrunning clutch goes in, the disk clutch opens and the driving control is direct to the primary thence to the secondary shaft. When this occurs the speed of the intergeared shafts drops sufficiently to thereafter allow a rise in engine speed to maximum speed limit, without overspeeding the accessories, the speed of which in the meantime is increased as the speed of the engine is increased.

In one phase of this invention, see Figs. 13 and 10, we propose to discontinue the operation of solenoid 108, if engine 204 becomes disabled, and if it is necessary to use engine 203 only for driving the vehicle and the accessories. When such an emergency arises, the hand lever 368, or its functional equivalent, is so moved as to cause clutch element 240 of Fig. 10 to engage clutch element 239, or to cause clutch element 341 of Fig. 15 to engage element 335, so that engine 203 drives the accessories. After this shift has been accomplished the lever 368 has assumed the dotted line position of Fig. 13 and has opened switch 415 and thus opened the circuit to solenoid 108. Thereafter, the drive for the accessories is through the overrunning clutch 10, 12, because the clutch 37 is held open by the spring 114.

In another phase of the invention means are provided by which engine 203 can also operate the solenoid 108 conformably to variations in engine speed, and in this case, after shift of lever 368 has opened switch 415, all that is necessary is to close hand switch 427, to put the engine-regulated switch 424 of engine 203 in circuit with solenoid 108. Thus, regulator arm 425 will now control switch 424 in the same way that engine 204 ordinarily controls switch 400.

In another phase of the invention the speed at which the centrifugal clutch of Fig. 17, or its equivalent, transmits power for driving the vehicle is related to the speed at which the solenoid 108 is de-energized, whereby the solenoid is de-energized at or about the engine speed at which the clutch transmits torque for vehicle drive. The speeds at which the clutch transmits torque may be varied, and the speed at which solenoid 108 is energized and de-energized may vary.

Having described our invention and the various phases and constructions thereof, what we claim as new and desire to secure by Letters Patent is:

1. A device of the class described comprising, an automotive vehicle having first and second engines, accessories for the vehicle, a speed-regulating device as an intermediate between the engines and in driving connection with the accessories, said device including first and second shafts and other shafts, and an overrunning clutch as a first clutch adapted to drive the first shaft, and a second clutch adapted to drive the second shaft, the second clutch being driven from the outer race of the first clutch, gearing connecting the first and second shafts so that either can be driven by the other, gearing connecting the first and second shafts with the other shafts, means by which either engine can be transmittibly connected to drive the outer race of the first clutch including a third clutch and means for shifting it, an electric circuit having a switch adapted to be opened when said third clutch is shifted to transmittibly connect the first engine for driving said outer race, the second engine having an engine-regulated switch adapted to open when engine speed rises above a predetermined R. P. M., means for automatically opening the second clutch, and electrically-operable means for holding the second clutch closed including said engine-regulated switch and the switch which is adapted to be opened when said third clutch is shifted.

2. A device of the class described comprising, an automotive vehicle having first and second engines, accessories for the vehicle, a speed-regulating device as an intermediate between the engines and in driving connection with the accessories, said device including first and second shafts, and other shafts, and an overrunning clutch as a first clutch adapted to drive the first shaft, and a disk clutch as a second clutch adapted to drive the second shaft, the second clutch being driven from the outer race of the first clutch, gearing connecting the first and second shafts so that either can be driven by the other, gearing connecting the first and second shafts with the other shafts, means by which either engine can be transmittibly connected to drive the outer race of the first clutch including a third clutch and means for shifting it, a switch adapted to be opened when said third clutch is shifted to transmittibly connect the first engine for driving said outer race, the second engine having an engine-regulated switch adapted to open when engine speed rises above a predetermined R. P. M., means for automatically opening the second clutch, electrically-operable means for holding the second clutch closed including an electric circuit through said engine-regulated switch and the switch which is shifted, means by which said engines can separately or simultaneously drive the vehicle including a centrifugal clutch driven by the second engine and adapted to transmit vehicle driving torque only when engine speed rises above said predetermined R. P. M.

3. A device of the class described comprising, a wheeled vehicle having accessories to be driven, and having first and second engines, means by which each engine separately or both engines together can drive the vehicle, gear trains by which either engine can drive the accessories, including a terminal shaft and a first clutch shiftable to transmittibly connect the train of either the first or the second engine with said terminal shaft, said second engine having an engine-governed first switch normally closed and adapted to open only when second engine speed rises to a predetermined speed which is substantially less than its maximum potential speed, said first switch being adapted to remain open while engine speed remains above the said predetermined speed, intermediate gearing for driving said accessories and driven from said terminal shaft, said gearing including a second clutch and having elements so associated that when the second clutch is closed the accessories are operated at proper speeds and so that when the clutch is opened the driving sequence of the gearing elements are so changed as to act temporarily to so reduce accessory speeds that thereafter as the second engine speed continues to rise the accessories are properly operated without overspeeding, a circuit for the first switch, and electro-mechanical means in part in said circuit and controlled by said switch to open said second clutch when said first switch opens and to hold the second clutch closed as long as said first switch is closed, and a second normally closed switch in said circuit adapted to be opened by said first clutch when the same is shifted to transmittibly connect the accessory drive train of the first engine with said terminal shaft, whereby to interrupt the circuit to the first switch and thereby prevent closing of the second clutch.

4. A device of the class described comprising, a wheeled vehicle having accessories to be driven, and having first and second engines, means by which each engine separately or both engines together can drive the vehicle, gear trains by which either engine can drive the accessories, including a terminal shaft and a first clutch shiftable to transmittibly connect the train of either the first or the second engine with said terminal shaft, said second engine having an engine-governed first switch normally closed and adapted to open only when second engine speed rises to a predetermined speed which is substantially less than its maximum potential speed, said first switch adapted to remain open while engine speed remains above the said predetermined speed, intermediate gearing for driving said accessories and driven from said terminal shaft, said gearing including a second clutch and having elements so associated that when the second clutch is closed the accessories are operated at proper speeds and so that when the clutch is opened the driving sequence of the gearing elements are so changed as to act temporarily to so reduce accessory speeds that thereafter as the second engine speed continues to rise the accessories are properly operated without overspeeding, a circuit for the first switch, and electromechanical means in part in said circuit and controlled by said switch to open said second clutch when said switch opens and to hold the second clutch in as long as said first switch is closed, a second normally closed switch in said circuit adapted to be opened by said first clutch when the same is shifted to transmittibly connect the accessory drive train of the first engine with said terminal shaft, whereby to interrupt the circuit to the first switch and thereby prevent closing of the second clutch, and a third switch in said circuit, engine-controlled by said first engine to open when first engine speed rises above a predetermined minimum, and a fourth switch adapted to be manually closed to complete the circuit between the third switch and said electro-mechanical means.

5. A device of the class described comprising, an automotive vehicle having first and second engines, accessories for the vehicle including an electric generator, a speed-regulating device as an intermediate between the engines and in driving connection with the accessories, including first and second shafts and intergeared means connecting the shafts and having a shiftable part, said means adapted at low engine speed to cause the accessories to be driven substantially at their rated speeds from the second shaft as the primary drive, and further adapted at higher engine speeds to shift said part to cause the accessories to be driven from the first shaft as the primary drive temporarily at speeds approximately one-half of their rated speeds, means by which either engine can be transmittibly connected to drive said first shaft, including a clutch, a switch adapted to be opened when said clutch is shifted to transmittibly connect the first engine for driving said first shaft, the second engine having an engine-regulated switch adapted to open when engine speed rises above a said low engine speed, means electrically-operable for holding said shiftable part positioned to obtain accessory drive through said second shaft, including an electric circuit from the generator through said engine-regulated switch and the switch which is adapted to be opened when said clutch is shifted, and means by which said engines can separately or simultaneously drive the vehicle including a centrifugal clutch driven by the second engine and adapted to transmit vehicle driving torque only when engine speed rises to said higher speeds.

6. A device of the class described comprising, a wheeled vehicle to be driven, and accessories for the vehicle, gearing as a unit from which all accessories are driven and upon which the power elements of the accessories are mounted, first and second engines, means by which the second engine drives the gearing through a single power input shaft, means by which either engine can drive the accessories while it is driving the vehicle, the second engine having a centrifugal clutch which automatically transmits power for driving the wheels of the vehicle when engine speed is accelerated to predetermined R. P. M. which is substantially less than its potential R. P. M., said engine having an engine-regulated carburetor which is fully open when the engine starts and which alone automatically fuels the engine at a constant speed when below said predetermined R. P. M., and which closes when that speed is exceeded, said engine having a manually-operable large carburetor adapted to take engine fueling control away from the small carburetor to fuel the engine at speeds which cause said centrifugal clutch to transmit power, and which will maintain clutch operation as long as higher engine speed continues, said gearing including a non-centrifugal clutch and having elements so associated that when said clutch is closed the accessories are operated at about their rated speeds for engine speeds below said predetermined R. P. M. and so that when said clutch is open certain of the gearing elements act to so reduce the speed of the accessories that at engine speeds above said predetermined R. P. M. and up to the maximum R. P. M. of the engine the accessories will not be overspeeded, and said engine having an engine-control switch which is closed at engine speeds below said predetermined R. P. M. and which is opened and remains open at speeds above said predetermined R. P. M., a circuit for the switch, and means in part in said circuit and controlled through the switch for opening said clutch when engine speed rises above said predetermined R. P. M.

7. A device of the class described comprising, an engine having carburetion means adapted to fuel the engine for low and high speeds, said engine having an engine-regulated arm for stopping low speed carburetion action when engine speed rises above a predetermined minimum, a device to be driven, intermediate gearing through which the engine drives said device, said gearing including electrically-controllable means adapted to effect a change in the gearing such as to temporarily reduce the speed of the driven device, said electrical means including a switch which is also controlled by said engine-regulated arm to operate said electrical means to automatically effect said change substantially as said arm acts to stop low speed fueling action.

8. A device of the class described comprising, an engine having carburetion means adapted to fuel the engine for low and high speeds, said engine having an engine-regulated arm controlling said carburetion means for fueling the engine at low speed and adapted to stop low speed fueling action when engine speed rises above a predetermined minimum, a device to be driven, intermediate gearing through which the engine drives said device, said bearing including electrically-controllable means adapted to effect a change in the gearing such as to temporarily reduce the speed of the driven device, said electrical means including a switch which is also controlled by said engine-regulated arm to operate said electrical means to effect said change substantially as said arm acts to stop low speed fueling action.

9. A device of the class described comprising, an engine having manually controllable first carburetion means adapted to fuel the engine only at high speeds, said engine having an engine-regulated arm controlling second carburetion means for fueling the engine only at low speed, and adapted to stop fueling action when engine speed rises as a result of operation of said first carburetion means, a device to be driven, intermediate gearing through which the engine drives said device, said gearing including electrically-controllable means adapted to effect a change in the gearing such as to temporarily reduce the speed of the driven device, said electrical means including a switch which is also controlled by said engine-regulated arm to operate said electrical means to effect said change substantially when the first carburetion means begins to operate.

(References on following page)

References Cited in the file of this patent

UNITED STATES PATENTS

| Number | Name | Date |
|---|---|---|
| 784,285 | Sturtevant et al. | Mar. 7, 1905 |
| 1,288,679 | Reichenbach | Dec. 24, 1918 |
| 1,378,490 | Sperry | May 17, 1921 |
| 1,826,675 | Roberts | Oct. 6, 1931 |
| 2,000,709 | Matthews | May 7, 1935 |
| 2,051,553 | Fleischel | Aug. 18, 1936 |
| 2,130,855 | Oliver | Sept. 20, 1938 |
| 2,156,698 | Martin | May 2, 1939 |
| 2,195,139 | Waseige | Mar. 26, 1940 |
| 2,267,066 | Wolf | Dec. 23, 1941 |
| 2,375,783 | Gilfillan | May 15, 1945 |
| 2,449,546 | Buckendale | Sept. 21, 1948 |
| 2,454,293 | Waseige | Nov. 23, 1948 |
| 2,482,460 | Browne | Sept. 20, 1949 |